(12) United States Patent
Lerner

(10) Patent No.: US 10,217,340 B2
(45) Date of Patent: Feb. 26, 2019

(54) RFID READER AND ANTENNA SYSTEM FOR LOCATING ITEMS USING A MOBILE DEVICE

(71) Applicant: Tag & Find Wireless Solutions Ltd., Haifa (IL)

(72) Inventor: Yulia Lerner, Haifa (IL)

(73) Assignee: Tag & Find Wireless Solutions Ltd., Haifa (IL)

( * ) Notice: Subject to any disclaimer, the term of this patent is extended or adjusted under 35 U.S.C. 154(b) by 0 days.

(21) Appl. No.: 15/375,205

(22) Filed: Dec. 12, 2016

(65) Prior Publication Data
US 2017/0092090 A1      Mar. 30, 2017

Related U.S. Application Data

(63) Continuation-in-part of application No. PCT/IL2015/050589, filed on Jun. 10, 2015.

(60) Provisional application No. 62/016,095, filed on Jun. 24, 2014, provisional application No. 62/009,931, filed on Jun. 10, 2014, provisional application No. 62/016,698, filed on Jun. 25, 2014, provisional application No. 62/024,511, filed on Jul. 15, 2014.

(51) Int. Cl.
*G06K 7/10* (2006.01)
*G08B 13/24* (2006.01)

(52) U.S. Cl.
CPC ..... *G08B 13/2462* (2013.01); *G06K 7/10128* (2013.01); *G06K 7/10366* (2013.01)

(58) Field of Classification Search
CPC ..................... G08B 13/2462; G06K 7/10366
See application file for complete search history.

(56) References Cited

U.S. PATENT DOCUMENTS

| | | | | |
|---|---|---|---|---|
| 4,515,167 | A | * 5/1985 | Hochman | A61B 10/0012 600/549 |
| 5,544,268 | A | * 8/1996 | Bischel | G02F 1/011 385/16 |
| 5,574,470 | A | * 11/1996 | de Vall | G06K 7/10336 340/572.7 |
| 5,777,581 | A | 7/1998 | Lilly et al. | |

(Continued)

FOREIGN PATENT DOCUMENTS

| WO | WO 2012/044524 | 4/2012 |
|---|---|---|
| WO | WO 2015/189846 | 12/2015 |

OTHER PUBLICATIONS

International Preliminary Report on Patentability dated Dec. 22, 2016 From the International Bureau of WIPO Re. Application No. PCT/IL2015/050589. (10 Pages).

(Continued)

*Primary Examiner* — Joseph H Feild
*Assistant Examiner* — Rufus C Point

(57) ABSTRACT

A method for locating a radio frequency identification (RFID) tag, comprising: monitoring by an RFID reader device at least two distance measurements of an RFID tag from the RFID reader device; monitoring a relative location of the RFID reader device for each of the distance measurements by analyzing orientation data and translational movement data of the RFID reader device; and calculating a location of the RFID tag relative to a current location of the RFID reader device based on the at least two distance measurements and the relative locations.

10 Claims, 21 Drawing Sheets

(56) References Cited

U.S. PATENT DOCUMENTS

| | | | | |
|---|---|---|---|---|
| 6,212,414 B1* | 4/2001 | Alameh | H04B 1/385 | 455/347 |
| 7,365,686 B2* | 4/2008 | Sakama | H01Q 1/22 | 235/492 |
| 7,427,955 B2* | 9/2008 | Choi | H01Q 1/22 | 343/700 MS |
| 7,576,657 B2* | 8/2009 | Duron | G06K 7/0008 | 340/10.1 |
| 7,876,227 B2* | 1/2011 | Bellows | H01Q 1/2216 | 340/10.42 |
| 7,902,984 B2* | 3/2011 | Duron | G06K 7/0008 | 340/10.1 |
| 7,936,268 B2* | 5/2011 | Tuttle | H01Q 1/2225 | 340/10.1 |
| 8,064,533 B2* | 11/2011 | Rofougaran | H01L 23/66 | 375/260 |
| 8,073,515 B2* | 12/2011 | Rofougaran | H04B 7/0682 | 455/575.7 |
| 8,090,044 B2* | 1/2012 | Rofougaran | H01L 23/66 | 375/259 |
| 8,188,908 B2* | 5/2012 | Landt | G01S 3/02 | 342/127 |
| 8,366,003 B2* | 2/2013 | Mohan | G06K 7/10831 | 235/462.01 |
| 9,164,169 B2* | 10/2015 | Karmakar | G01S 13/753 | |
| 9,230,254 B1* | 1/2016 | Sharifi Mehr | G06Q 20/3567 | |
| 9,373,012 B2* | 6/2016 | Pesavento | H01Q 1/2216 | |
| 9,467,118 B2* | 10/2016 | Zhou | H03H 7/18 | |
| 9,747,475 B2* | 8/2017 | Fujioka | G06K 7/10009 | |
| 2005/0145187 A1* | 7/2005 | Gray | A01K 11/008 | 119/174 |
| 2006/0145926 A1* | 7/2006 | Choi | H01Q 1/22 | 343/700 MS |
| 2007/0222609 A1* | 9/2007 | Duron | G06K 7/0008 | 340/572.7 |
| 2009/0130990 A1* | 5/2009 | Rofougaran | H01L 23/66 | 455/73 |
| 2011/0128129 A1* | 6/2011 | Graczyk | G06K 17/0022 | 340/10.33 |
| 2011/0140857 A1* | 6/2011 | Hull | G06F 17/30876 | 340/10.1 |
| 2012/0293136 A1* | 11/2012 | Chen | G06F 1/266 | 320/162 |
| 2013/0072136 A1 | 3/2013 | Besoli et al. | | |
| 2015/0116094 A1* | 4/2015 | Fujioka | G06K 7/10009 | 340/10.5 |
| 2016/0110716 A1* | 4/2016 | Sharifi Mehr | G06Q 20/3567 | 705/75 |

OTHER PUBLICATIONS

Communication Relating to the Results of the Partial International Search dated Sep. 24, 2015 From the International Searching Authority Re. Application No. PCT/IL2015/050589.

International Search Report and the Written Opinion dated Nov. 5, 2015 From the International Searching Authority Re. Application No. PCT/IL2015/050589.

Notification of Office Action and Search Report dated Jul. 30, 2018 From the State Intellectual Property Office of the People's Republic of China Re. 201580043144.8 and Its Summary in English. (15 Pages).

* cited by examiner

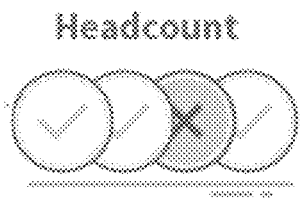
FIG. 21C
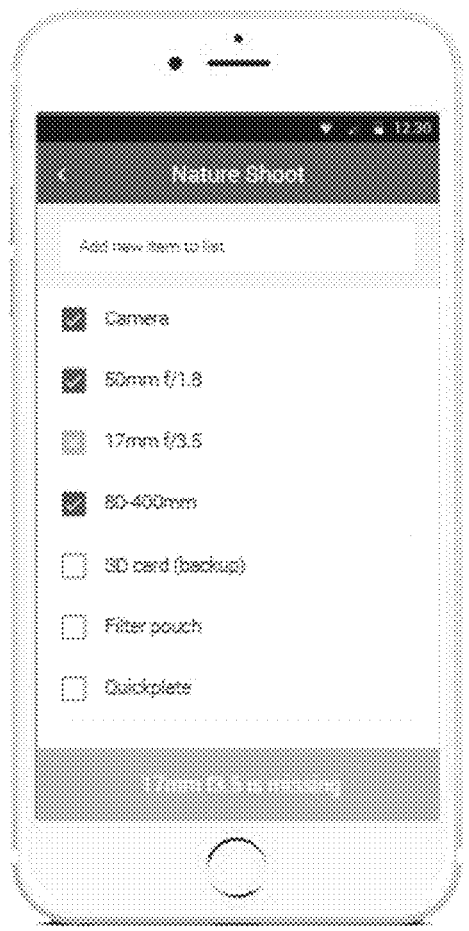 
FIG. 21A  FIG. 21B

RFID READER AND ANTENNA SYSTEM FOR LOCATING ITEMS USING A MOBILE DEVICE

RELATED APPLICATIONS

This application is a Continuation In Part of PCT Patent Application No. PCT/IL2015/050589 having International filing date of Jun. 10, 2015, which claims the benefit of priority under 35 USC § 119(e) of U.S. Provisional Patent Application Nos. 62/016,095 filed on Jun. 24, 2014, 62/009,931 filed on Jun. 10, 2014, 62/016,698 filed on Jun. 25, 2014 and 62/024,511 filed on Jul. 15, 2014. The contents of the above applications are all incorporated by reference as if fully set forth herein in their entirety.

FIELD AND BACKGROUND OF THE INVENTION

The present invention, in some embodiments thereof, relates to radio frequency identification (RFID) object locators and, more particularly, but not exclusively, to RFID systems with multi-directional antennas and/or implemented for locating objects using a mobile device.

RFID devices and systems have become widely used in manufacturing, waste management, transportation, shipping, postal tracking, and highway toll management. They are also very useful for different types of logistic management procedures, for example inventory tracking and management.

A typical RFID device and system includes RFID tags (labels), at least one RFID reader detection system with an antenna for electromagnetic communication with the RFID tags, a computation device to analyze received data and a control device to control the RFID reader. The RFID reader includes a transmitter that provides energy and/or information to the tags and a receiver to receive information from the tags, for example, to identity them.

An RFID tag may be "Active" meaning that it includes an internal power source, or "Passive" meaning that that it is energized by the electromagnetic field transmitted by the RFID reader antenna. Tags communicate with the RFID reader using a pre-defined communication protocol that allows the RFID reader to receive information from one or more tags.

Although the information provided by an RFID tag varies according to the particular application that the RFID reader uses, typically the information identifies the article to which the tag is affixed. The articles may be for example containers, manufactured items, books, files, medical equipment, or just about any other tangible article. The RFID tag may provide additional information about the article, such as information relating to the content of the article, its shipping date, and its storage conditions. RFID tags may also be used during manufacturing processes. For example, tags may be placed on different components of the product with information regarding the assembly procedures for each component.

The transmitter of the RFID reader outputs radio frequency (RF) signals through an antenna to create an electromagnetic field that, when the signals reach the tag, cause the tag to respond with an RF signal carrying the information associated with the tag. The transmitter typically uses an amplifier to drive its antenna with a modulated output signal.

SUMMARY OF THE INVENTION

According to an aspect of some embodiments of the present invention there is provided a method for locating a radio frequency identification (RFID) tag, comprising: monitoring by an RFID reader device at least two distance measurements of an RFID tag from the RFID reader device; monitoring a relative location of the RFID reader device for each of the distance measurements by analyzing orientation data and translational movement data of the RFID reader device; and calculating a location of the RFID tag relative to a current location of the RFID reader device based on the at least two distance measurements and the relative locations.

Optionally, the calculating includes finding a shortest distance between two spheres each having a radius of one of the at least two distance measurements and a center at a respective the relative location.

Optionally, the method further comprises: monitoring by the RFID reader device at least two additional distance measurements of an RFID tag from each of at least two antennas of the RFID reader device; wherein the calculating is further based on the additional distance measurements.

Optionally, the method further comprises: monitoring by a multi-directional antenna of the RFID reader device a direction of an RFID tag relative to the RFID reader device; wherein the calculating is further based on the direction.

More optionally, the multi-directional antenna is an antenna array including at least one antenna element.

Optionally, the orientation data and translational movement data are received from at least one of a geomagnetic field sensor and an acceleration sensor of a mobile device attached to the RFID reader device.

Optionally, the orientation data is received from a gyroscope of a mobile device attached to the RFID reader device.

Optionally, the RFID reader device is attached to a mobile device, the mobile device includes a user interface indicating the location of the RFID tag to a user of the mobile device.

More optionally, the user interface instruct the user to move from a first location to a second location after obtaining a first of the at least two distance measurements, for obtaining a second of the at least two distance measurements.

More optionally, the user interface presents an augmented reality image that includes a visual indication of the location of the RFID tag.

According to an aspect of the invention, a wireless reader accessory comprises: at least one antenna, a controller for adjusting phase and amplitude of an alternating current provided to the at least one antenna to modify a polarization of a signal transmitted by the at least one antenna, and a body encasing the at least one antenna and the controller and shaped to be attached to an electronic mobile device.

Optionally, the at least one antenna comprises a multi-directional antenna array comprising at least two antenna elements substantially parallel to a ground conductive plate, each having horizontal and vertical polarizations, the at least one antenna is electronically connected to an electric power source, and the controller adjusts phase and amplitude of an alternating current provided to each one of the at least two antennas by the electric power source to modify at least one of polarization and direction of a signal transmitted by the antenna array.

More optionally, the at least two antenna elements includes at least one inverted F antenna element, the at least two antenna elements includes four antennas positioned in a rectangular arrangement, at least one of the four antennas is used for transmitting a signal and at least one of the four antennas is used for receiving a signal, and the controller includes at least one phase and amplitude control device.

More optionally, at least one of the at least two antenna elements is an antenna element for radio frequency identification (RFID), comprising a ground conductive element, a patch conductive plate substantially parallel to the ground conductive plate, a dielectric substrate positioned between the ground conductive plate and the patch conductive plate, at least two feeding lines, each electronically connected to the patch conductive plate and to an adjustable electric power source, and a controller for adjusting phase and amplitude of an alternating current provided by the electric power source to modify an electric potential difference between said at least two feeding lines. The electric potential difference is modified to create alternating linear and circular polarizations of a signal transmitted by the antenna.

Optionally, the body is shaped as a protective case for the electronic mobile device and is connected to the electronic mobile device via a charging connector of the electronic mobile device.

Optionally, the wireless reader accessory further comprises a rechargeable battery. The alternating current is provided by the rechargeable battery.

Optionally, the alternating current is provided by a battery of an electronic mobile device.

More optionally, the wireless reader accessory further comprises a USB (Universal Serial Bus) receptacle for connecting to an electrical power source using a USB cable and charging the rechargeable battery, and a USB receptacle for connecting to an electronic mobile device having a rechargeable battery using a USB cable and charging the electronic mobile device's battery.

Optionally, the controller is controlled by an application installed on the electronic mobile device. The application includes a user interface that presents a location of an RFID tag that is located by the wireless reader accessory, and the application performs periodic scans to find the location of an RFID tag that is located by the wireless reader accessory.

According to an aspect of the invention, a wireless reader accessory comprises a housing encasing a radio frequency (RF) transceiver adapted to transmitting and receiving RF signals and a cord physically connecting between the housing and a key chain ring. The cord comprises therealong a flexible antenna which is operatively connected to the RF transceiver.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 21A is an exemplary screenshot of a possible user interface showing status of the location of multiple items, according to some embodiments of the present invention;

FIG. 21B is an exemplary screenshot of a possible user interface showing status after pairing an RFID tag with an RFID accessory;

FIG. 21C is an exemplary screenshot of another possible user interface showing status of the location of a plurality of items, according to some embodiments of the present invention.

DESCRIPTION OF SPECIFIC EMBODIMENTS OF THE INVENTION

Figure 1:
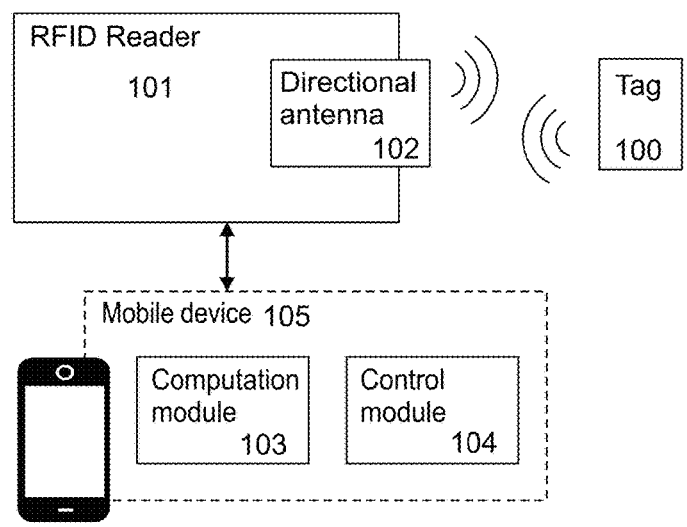
FIG. 1 is a schematic illustration of a radio frequency identification (RFID) reader implemented as a mobile device accessory, according to some embodiments of the present invention.

The present invention, in some embodiments thereof, relates to radio frequency identification (RFID) object locators and, more particularly, but not exclusively, to RFID systems with multi-directional antennas and/or implemented for locating objects using a mobile device.

According to some embodiments of the present invention, there is provided a wireless reader accessory that includes an RFID reader and a multi-directional RFID antenna(s), which is controlled by a mobile device, such as a tablet or a smartphone.

Optionally, the mobile device may be a wearable device such as a smart watch. The wireless reader accessory and application installed on the electronic mobile device may be used to search and locate RFID tagged items by combining mobile device's motion sensors data and RFID reader's data via different algorithms. This method increases accuracy and efficiency of locating objects by RFID.

According to some embodiments of the present invention, there is provided an RFID system that uses multi-directional RFID antenna(s) with a direction scanning controlled by switching between variable linear and circular polarizations. Such a scanning system is designed to increase the functional orientation in relation to the location of a scanned target, thus solve the technical problem of reading RFID tags that are oriented in an angular direction to the RFID reader. These antennas also increase the range of RFID readers and have smaller sizes than some other antennas used for RFID.

Optionally, an element of the multi-directional RFID antenna is implemented as a printed microstrip patch antenna that includes a multilayered dielectric structure with any symmetrical form of metal prints on the dielectric layers and two or more feeding systems. Changing the feeding to the antenna generates rotation modes in the cavity (dielectric) region which create variable linear and circular polarizations of electric and magnetic fields. Using such an antenna for detecting RFID tags significantly increases RFID reader sensitivity and significantly decreases energy consumption, and is therefore suitable to be used with mobile phones and to be implemented in mobile phone accessories.

Optionally, the multi-directional RFID antenna is implemented as a beam steering antenna array. The antenna array is composed of at least two antennas, such as inverted F antenna (IFA) elements with the same ground plane and/or printed microstrip patch antennas. The antennas are operative by adjusting the phases and amplitudes to give any desired polarization of the transmitted signal, to create beam scanning and polarization within a plane.

According to some embodiments of the present invention, there is provided a wireless reader accessory that is a RFID reader accessory that includes an RFID reader which is mounted to be closely attached to a mobile device, such as a smartphone or tablet. The RFID reader comprises integrated circuit and an antenna. The RFID reader accessory may be a protective case a unit embedded in the smartphone's back-cover and/or a dongle unit adapted to be connected to the mobile device via a connector. In some such embodiments the case may have a cover. In other embodiments the case may be without a cover. The RFID reader accessory communicates with the mobile device via a wired channel such as USB and/or via a wireless channel such as near field communications (NFC), Wi-Fi, Bluetooth™ or Bluetooth™ Low Energy (BLE). The RFID reader may use the mobile device's power via a USB connection, and/or it may have its own power-supply (e.g., a battery). In some embodiments the RFID reader can provide power to the mobile device. Optionally, the power-supply may be rechargeable, for example using a Universal Serial Bus (USB) connection. The RFID reader accessory may comprise a USB receptacle, for example a Type-A, Micro-AB, Micro-B, or Type-C receptacle. In embodiments where the RFID reader accessory is a dongle unit, the dongle unit's antenna may be inside a cord physically attached to the dongle unit's body. The antenna may be flexible, made of flexible material as used in the art. For example, the antenna may be made of a material that is polymer based such as Polydimethyl Siloxane (PDMS) or PDMS-ceramic composites or made of micro fluidics (liquid metals). An antenna inside a cord may be, but is not limited to being, a directional antenna, a multi-directional antenna, a bi-polar antenna, a monopole antenna or a circular polarization antenna. Optionally, an antenna inside a cord may be a dipole antenna with an omnidirectional pattern. In some embodiments having a cord, the cord may be between 30-35 millimeters thick and 100-110 millimeters long. Optionally, the cord may be made of a material that can be stretched such that the cord's length increases, for example by an additional 20-130 millimeters. Optionally, the dongle unit may have at least one other antenna inside the dongle unit's body. In some embodiments having a cord, the cord may be physically connected to a physical connector, such as a ring or clasp, which may be used to connect the dongle to another object such as a key chain ring. In some embodiments, the dongle unit's body may be shaped as an oblong object having a flat surface on one long side of the object. Optionally, the oblong object may be cylindrical having a flat surface on one long side of the cylinder, allowing a user to hold the RFID reader accessory in the user's hand and adjust the RFID reader accessory to lie flat against a mobile device having a flat back. As by holding the RFID reader accessory flat against the mobile device the RFID reader accessory is aligned with the mobile device, the RFID reader accessory can use the mobile device's sensors in a precise way.

In some embodiments having an RFID reader accessory shaped as a dongle unit, the dongle unit may comprise a Light Emitting Diode (LED) for indicating when an RFID tag cannot be located. In some embodiments the dongle unit may comprise a button for initiating communication with a mobile device.

Optionally, an application is installed on the mobile device, having a user interface that presents the location of the tracked RFID tag relative to the mobile device. The user interface may include, for example, an arrow pointing to the direction of the RFID tag relative to the mobile device and/or the distance to the RFID tag, so the user is guided to the location of the RFID tag. Optionally, the user interface may include an augmented reality real-time image of the surrounding area, with the RFID tag marked on the image. Optionally, the user interface emulates guiding the user toward the RFID tag while actually guiding the user via a path that allows acquiring triangulation data. For example, the user is first guided 1 meter left to acquire data and then forward toward the RFID tag.

In some embodiments, the application may indicate the distance to the RFID tag by instructing the mobile device to emit a sound or by controlling the brightness of the mobile device's display. In some embodiments, the intensity of the sound or display brightness may decrease when the RFID tag is far from the RFID reader and increase as the distance between the RFID tag and RFID reader decreases. Optionally, the application may indicate the distance to the RFID tag while emulating guiding the user toward an RFID tag.

In some embodiments, the application may perform a periodic scan to locate RFID tags, for example once every 5-10 minutes. Optionally, the application may perform periodic scan to locate RFID tags automatically when the application detects that the RFID reader is outdoors, for example by using location services on the mobile device. Optionally, when the application detects the location of an RFID tag, the application may store the RFID tag's location on a digital storage. In such embodiments the application may show the history of an RFID tag's locations in a report or on an image of a map.

According to some embodiments of the present invention, there is provided a method for calculating the location of an RFID tag using a combination of data obtained from motion sensors and an RFID reader. Optionally the information from the RFID reader includes the strength of the RF signal intercepted from the RFID tag, for example the levels of received signal strength indication (RSSI) intercepted from the RFID tag. The location of the RFID reader may be determined by the motion sensors and the distance to the RFID tag, so the location of an RFID tag is determined by triangulation. In most existing RFID systems, when an RFID tag reader is used, the only provided data is whether the reader senses the tag with a specific ID or not, without any additional information regarding neither tag's location nor distance to the tag. The method may be implemented using a mobile device with a gyroscope and accelerometer built-in together with specially designed RFID reader attached to it so that real-time location of an RFID tagged item may be provided.

Optionally, the direction and distance to the RFID tag is determined by using different directions of the main lobe of a multi-directional antenna. Optionally, the direction and distance to the RFID tag is determined by using two or more antennas of the same RFID reader, using the known difference between the locations of the antennas to perform triangulation.

Optionally, the location of the mobile device is calculated using a motion path detection algorithm based on geomagnetic and/or acceleration sensors of the mobile device. While accelerometer data is used for detecting movement direction and its magnitude, magnetometer data adjusts the movement data to a current device orientation, providing the ability to combine both sensors' data to receive the correct movement vector value. This allows detecting precisely and effectively small movements of the mobile device in an indoor environment that may be used for the calculation of a relative location of an RFID tag.

The present invention, in some embodiments thereof, may provide a solution for inventory management for professionals having multiple items occupying a common container (for example a bag), comprising a device inside/outside of the container and optionally an additional antenna installed in the container's material.

In some embodiments having an application installed on the mobile device, the application may have a user interface for creating lists of items by category or location and naming the lists for future reference (for example, "Nature Shooting Equipment"). In such embodiments, the application may have a user interface for instructing searching for multiple items at once with a single instruction (for example, a single tap on a button). Optionally, the application may have a user interface for instructing searching for all items on a single list. Optionally, the application may have a user interface for instructing searching for all items on all lists. The application may have a user interface for displaying to the user which items were detected and which items were not detected. Optionally, the application may initiate a notification alert when an item is not found.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an RFID reader implemented as a RFID reader accessory, according to some embodiments of the present invention. The RFID reader accessory, that is connected to a mobile device, transmit and receives signals to locate RFID tags.

The RFID reader accessory includes an RFID reader module 101 with an antenna 102. The system may also include a computation module 103 to analyze received data and a control module 104 to control RFID reader 101 and the electric signal feed transferred to antenna 102, both may be implemented in a mobile device 105 to which the RFID reader accessory is attached.

The RFID reader accessory is intended to locate at least one RFID tag 100. Tag 100 may be, for example, a passive UHF RFID tag, which comply with standard communication air protocol ISO18000-6(X). Each tag 100 has a unique ID, for example EPCGlobal Gen2 Tag Data Standard, and may have additional memory to store other information.

Figure 2:
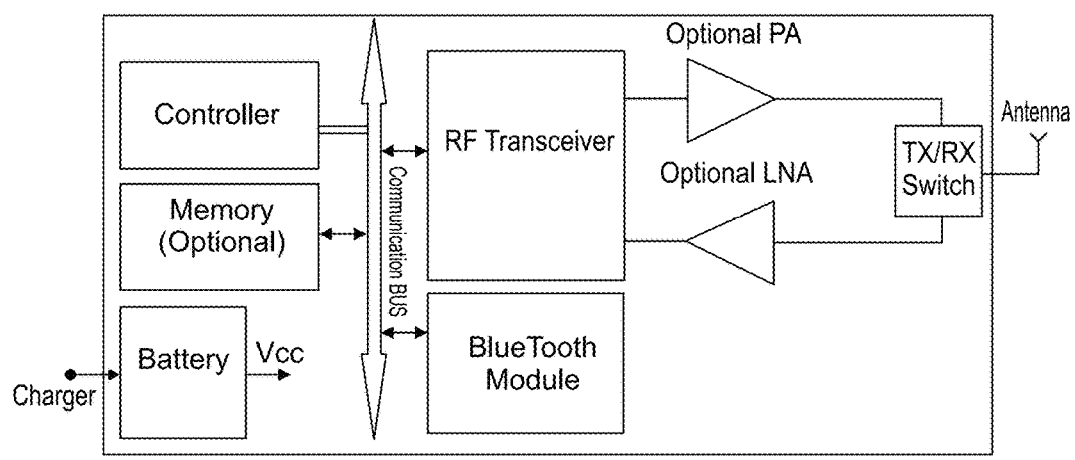
FIG. 2 is a schematic illustration of an exemplary typical RFID reader, according to some embodiments of the present invention.

RFID reader 101 may be designed in any way, as described above, and may be implemented, for example, on at least one printed circuit board (PCB). Reference is also made to FIG. 2, which is a schematic illustration of an exemplary typical RFID reader, according to some embodiments of the present invention. The RFID reader may include a real type processing system, for example one implementing an RFID System on a chip (SoC) with Transmitter/Receiver, inner Microcontroller unit (MCU) and Amplifier, and/or implementing a field-programmable gate array (FPGA) or a digital-signal processor (DSP), a transmitter and a receiver. The RFID reader may also include a MCU for communication and an amplifier of the signal coming to the antenna.

Computation module 103 and control module 104 may optionally be implemented as an application installed on mobile device 105. The modules may be, for example, software modules included in a mobile application and/or hardware elements implemented within the mobile device. Mobile device 105 may be, for example, a Smartphone, a tablet, a wearable device such as Google glass, a Smart watch, a laptop computer and/or the like. The application may be any software such as an App Store application or a Google Play application installed in the mobile device, a native operating system application and/or a browser add-on.

Alternatively, computation module 103 and control module 104 may be implemented as part of RFID reader 101, for example as hardware or software.

Antenna 102 may be a multi-directional and/or multi polarization RFID antenna with variable linear and/or circular polarizations.

Optionally, antenna 102 includes microstrip patch antenna element(s). The structure of the microstrip patch antenna includes at least two electric feeding lines connected to an electric power source, and a multilayered dielectric structure with any symmetrical form of metal prints on the dielectric layers, such as a circle and/or a square.

In general, a microstrip patch antenna may be described as a resonance cavity structure with resonance modes. These resonance modes are created in a dielectric region of the microstrip antenna and may be modified by the antenna feeding system, controlled by control module 104. For example, a phase shifter or a variable gain attenuator may be placed at the input of each antenna to control the mode excitation. Radiation characteristics of the microstrip patch antenna, such as polarization, directivity, and radiation direction, may be controlled by the resonance modes. The polarization properties of a microstrip patch antenna are manipulated by a dynamic variation of mode distribution in the dielectric region of an antenna, so the linear and circular polarizations of the antenna signal are dynamically (in time) modified.

Figures 3A, 3B:
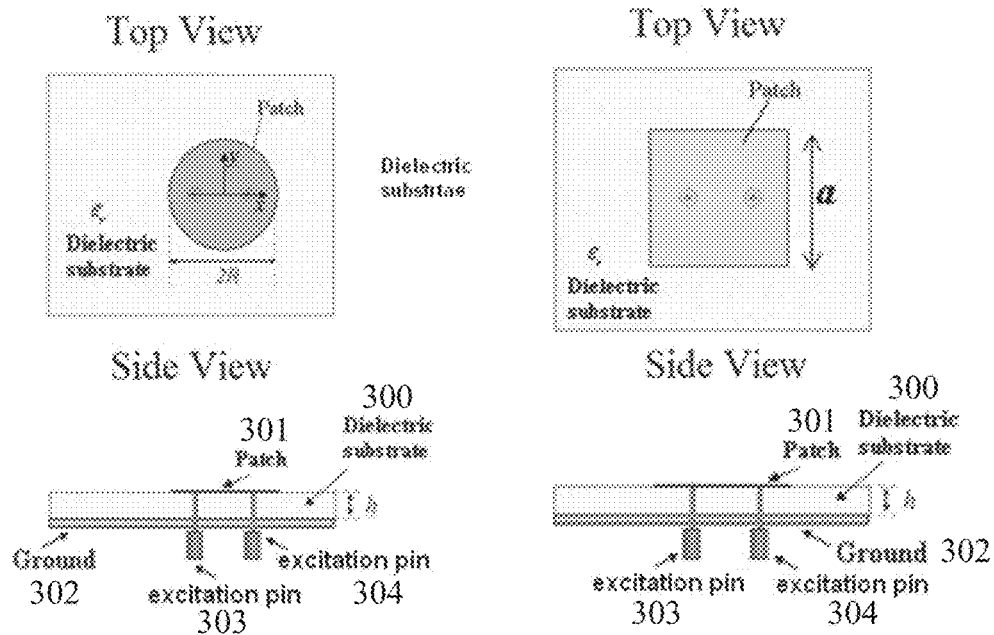
FIGS. 3A and 3B are schematic illustration of a top view and a side view of exemplary circular and square microstrip antenna elements, according to some embodiments of the present invention.

Reference is now made to FIGS. 3A and 3B, which are schematic illustration of a top view and a side view exemplary microstrip antenna elements, according to some embodiments of the present invention. FIG. 3A shows a circular microstrip patch with two feeding points and FIG. 3B shows a square micro strip patch with two feeding points.

A dielectric substrate 300 of thickness h separates a patch 301 from a ground plane 302. For each antenna, two excitation pins 303 and 304 electrically connect to patch 301 from the side of ground plane 302 through slots or apertures therein, but are electrically insulated from ground plane 302. The insulation from ground plane 302 is not shown in the figures, for clarity. Excitation pins 303 and 304 are used by a feeding system to feed patch 301, and they may be connected to the feeding system for example by coaxial cables, microstrip, stripline, or other types of transmission lines. Patch 301 and ground plane 302 may include an electrically conductive material such as copper, with or without gold or silver surfaces, and/or any other conductive material. Dielectric substrate 300 may include, for example, ceramic, composites, and/or plastic (such as the RO4000 series of Rogers corporation), and/or any other dielectric material. Optionally, the dielectric layer of the antenna may have multiple conductive printed patches on it.

Figure 4:
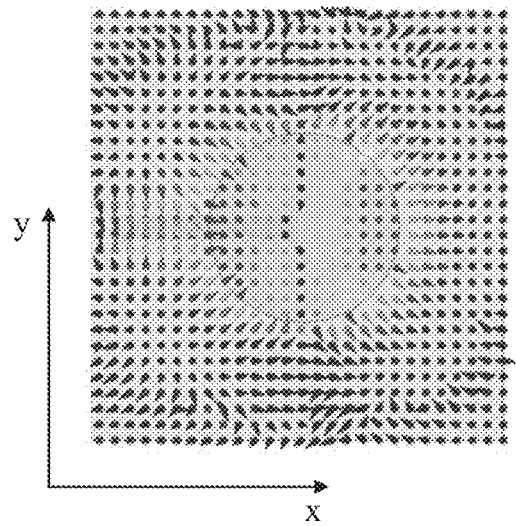
FIG. 4 is a schematic illustration of an electric field distribution in the region of a circular patch antenna, according to some embodiments of the present invention.

Reference is now made to FIG. 4 which is a schematic illustration of an electric field distribution in the region of a circular patch antenna, according to some embodiments of the present invention. By feeding both excitation pins of the antenna with the same amplitude and 180 degrees out of phase with each other, the excitation pins excite the first cavity mode electric field oscillation under the patch with intensity maxima distributed along the x-axis, and the electric fields are linearly polarized in the x direction emit linearly polarized electromagnetic fields in the far field region of the antenna.

Varying the amplitude, phase, and frequency of the signals produced by the feeding systems modifies the electric fields distribution in the dielectric region of the patch and accordingly modifies the radiating field's polarization. For example, having equal amplitudes and zero phase differences between the feeds, the maxima of the electric fields under the patch will be rotated 45 degrees with respect to the x-axis. In this case, the FF field of the antenna has a 45 degree linear polarization in the xy plane.

Figure 5:
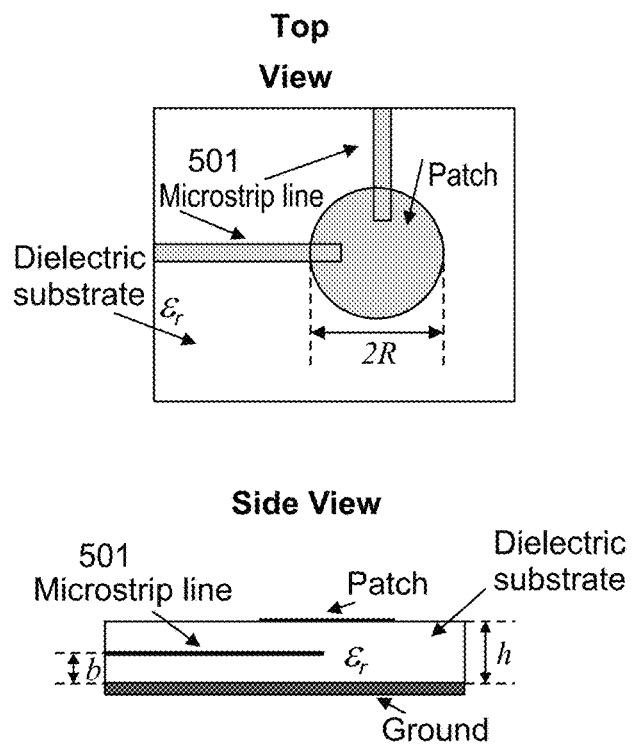
FIG. 5 is a schematic illustration of a circular patch microstrip antenna element fed by microstrip lines, according to some embodiments of the present invention.

Reference is now made to FIG. 5 which is a schematic illustration of a circular patch microstrip antenna element that is fed by microstrip lines 501 and 502 unlike being fed by excitation pins as the microstrip antenna is fed in FIGS. 3A and 3B. Optionally, the microstrip lines and the patch of the antenna are placed on two different layers, and the layers may be connected for example by adhesion. An electrical path is established between the microstrip line and the patch electromagnetically.

Figure 6:
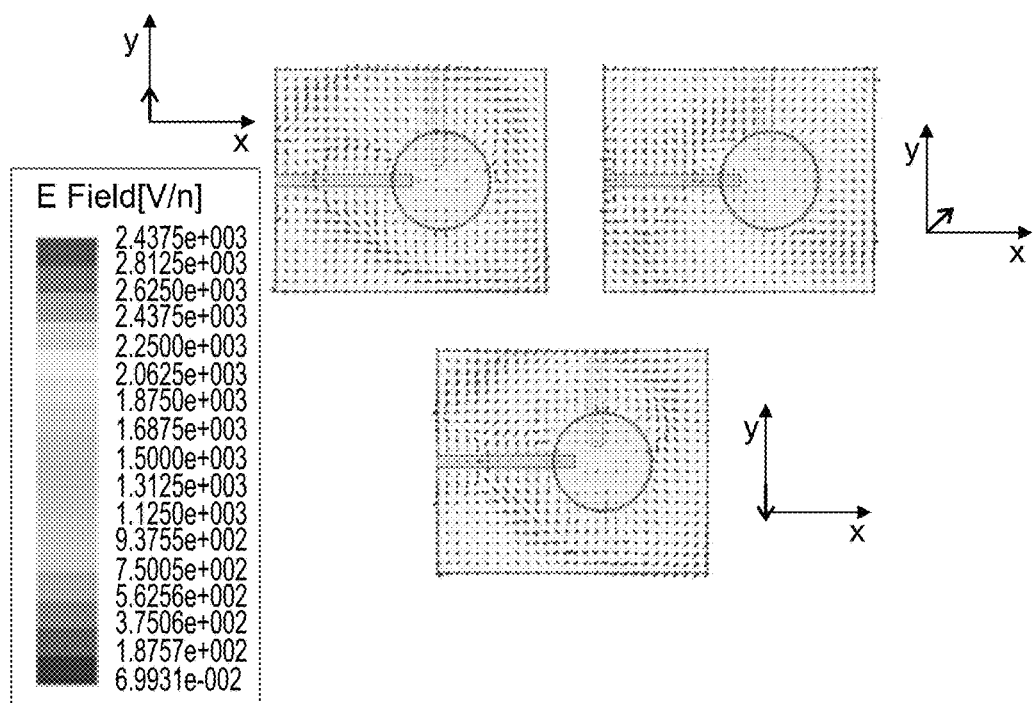
FIG. 6 is a schematic illustration of the rotating behavior of the electric fields in the region of the antenna element presented in FIG. 5, according to some embodiments of the present invention.

Reference is now made to FIG. 6 which is a schematic illustration of the rotating behavior of the electric fields in the region of the antenna presented in FIG. 5, according to some embodiments of the present invention.

Figure 7:
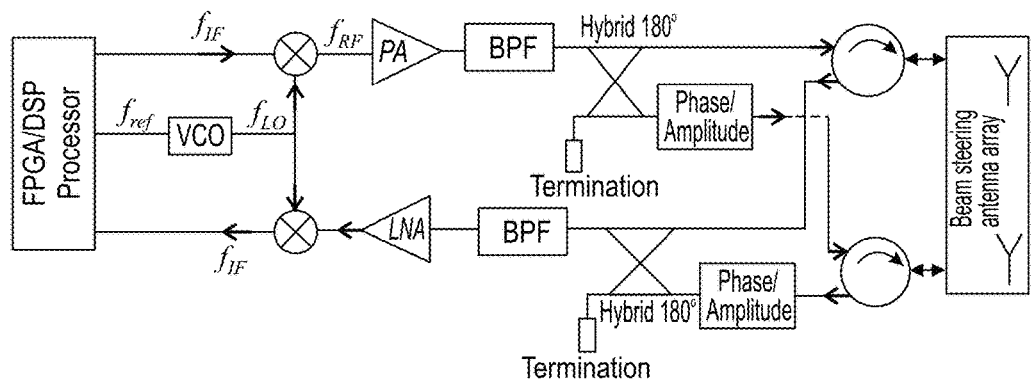
FIG. 7 is a circuit diagram of an RFID reader, according to some embodiments of the present invention.

Optionally, antenna 102 is a beam steering antenna array with adjustable polarization characteristics. The beam steering antenna array may include two or more antenna elements, such as microstrip patch antenna elements, IFA elements and/or any other type of antenna element(s). Reference is now made to FIG. 7 which is a circuit diagram of an RFID reader, according to some embodiments of the present invention.

The reader is comprised of a processing unit (the FPGA/DSP processor) in which a modulated intermediate frequency (IF) signal $f_{IF}$ is created. This signal is up-converted to a radio frequency signal $f_{RF}$ by a signal $f_{LO}$ that comes from a voltage controlled oscillator (VCO) fed with a reference frequency $f_{ref}$ from the processing unit. The signal $f_{RF}$ is amplified by power amplifier (PA) unit and passed through the band pass filter (BPF). The power of the signal is divided by a hybrid 180° coupler and then delivered to two antenna elements. A phase/amplitude control device is coupled to the hybrid to create additional differences between antenna elements. The phase/amplitude control device may be used for polarization and beam steering purposes.

The signals received from the two antenna elements are combined using a second hybrid 180°. A phase/amplitude control system is used for polarization and beam steering control. The combined signal then flows through a BPF and is amplified by a low noise amplifier (LNA), down-converted to IF frequency and demodulated in processing unit.

Although only two Rx/Tx channels are discussed with respect to FIG. 7, additional antenna elements may be implemented to create a system that supports multiple Rx/Tx channels.

Figure 8:
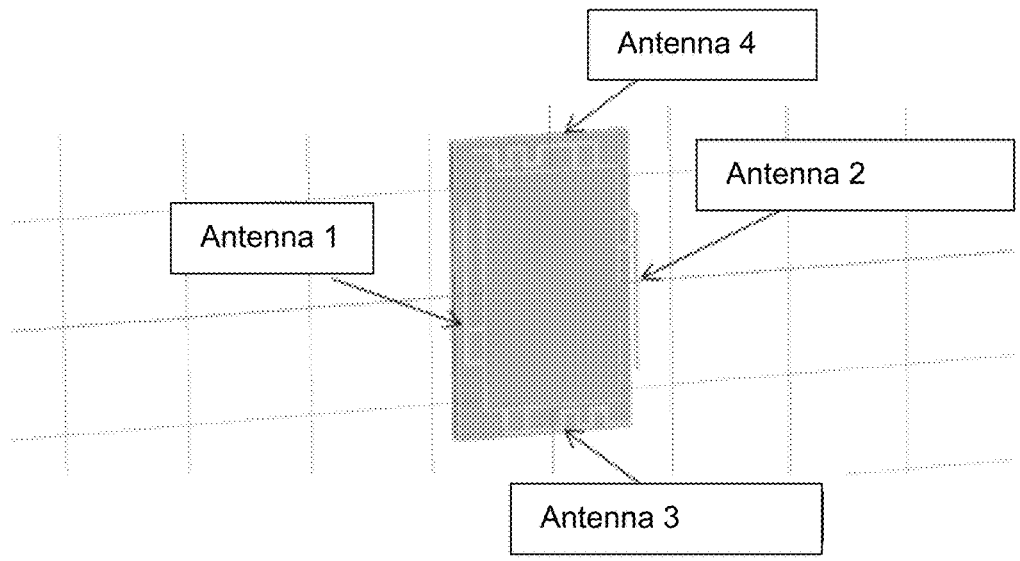
FIG. 8 is a schematic illustration of an exemplary structure of a beam steering antenna array with adjustable polarization characteristics, according to some embodiments of the present invention.

Reference is now made to FIG. 8 which is a schematic illustration of an exemplary structure of a beam steering antenna array with adjustable polarization characteristics, according to some embodiments of the present invention. The antenna array is composed of four IFA elements with the same ground plane. The elements are positioned in a rectangular arrangement. The antenna array may include two or more types of IFA elements, for example, two similar IFA elements are positioned at two opposing sides of the rectangle.

Each IFA element has horizontal and vertical polarizations. Each two IFA elements may be used to setup the beam scanning and polarization. For this setup, a specific combination of IFA elements with specific phases and amplitudes may give different polarizations. For example, Antenna 1 alone may radiate waves oscillating in x (H) and y (V) directions. Any two, three or all four antennas with appropriate phase and amplitude differences between them may radiate waves oscillating in different directions within the XY plane. The direction of polarization may be rotated in the XY plane. Meander lines may be used in the IFA element to increase the length of the electrical path. Multiple options for using the IFA element are available as working modes in this example: (1) four antennas used for receiving and transmitting; (2) three antennas used for transmitting and one for receiving; and (3) two antennas used for transmitting and two for receiving.

Figure 9A:
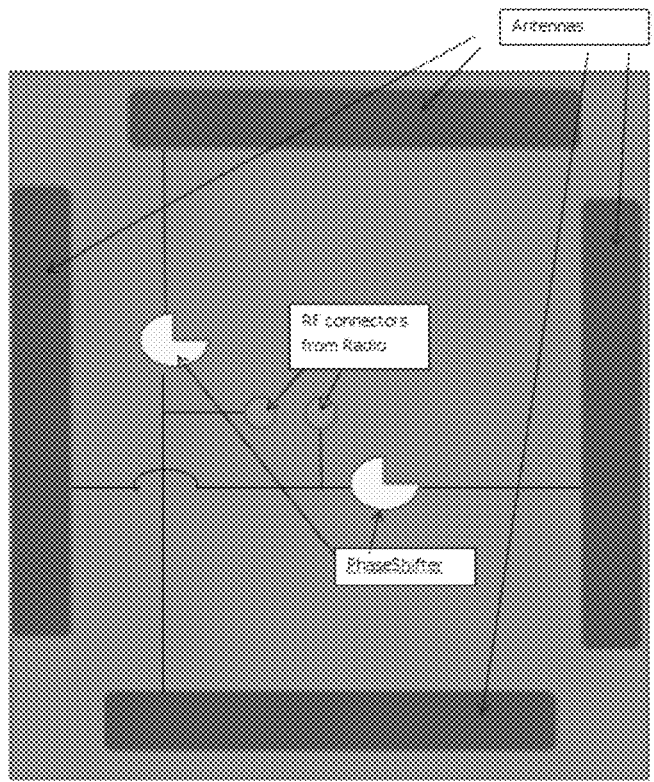
FIG. 9A and FIG. 9B are a schematic illustration of two exemplary connections of the beam steering antenna array of FIG. 8 to the transceiver (radio), according to some embodiments of the present invention.
Figure 9B:
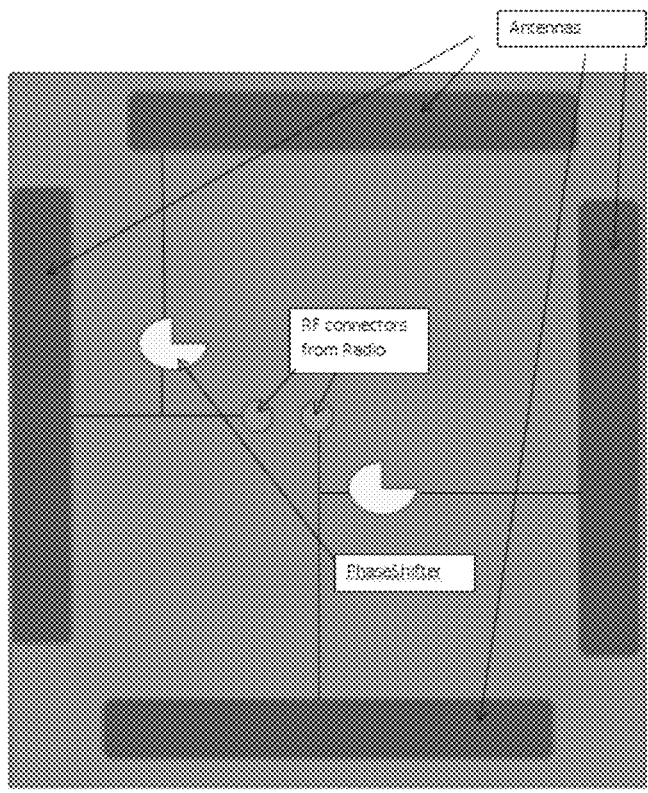
Figure 10A:
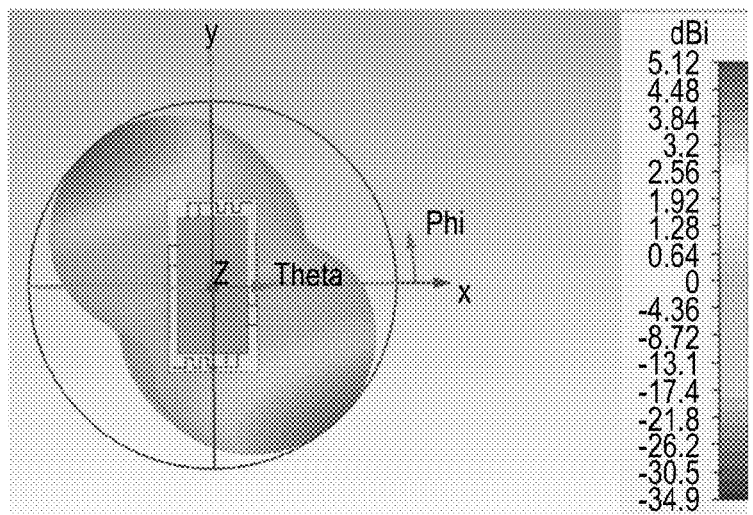
FIG. 10A to FIG. 10L are a schematic illustration of exemplary simulated radiation patterns of the beam steering antenna array of FIG. 8, according to some embodiments of the present invention.
Figure 10B:
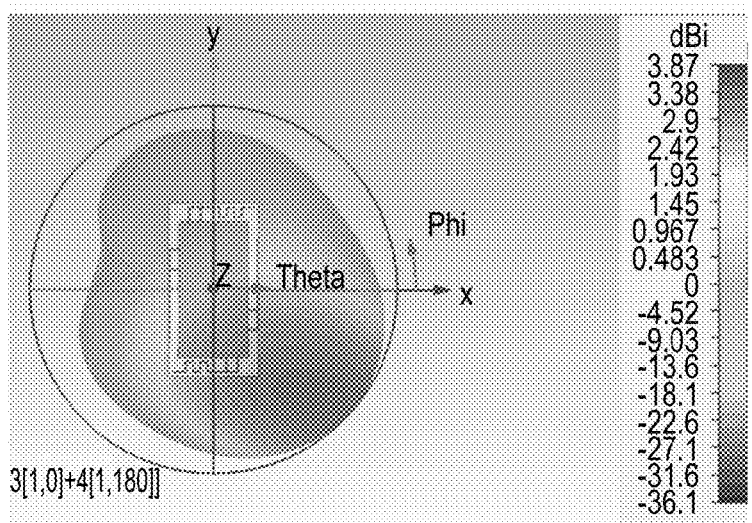
Figure 10C:
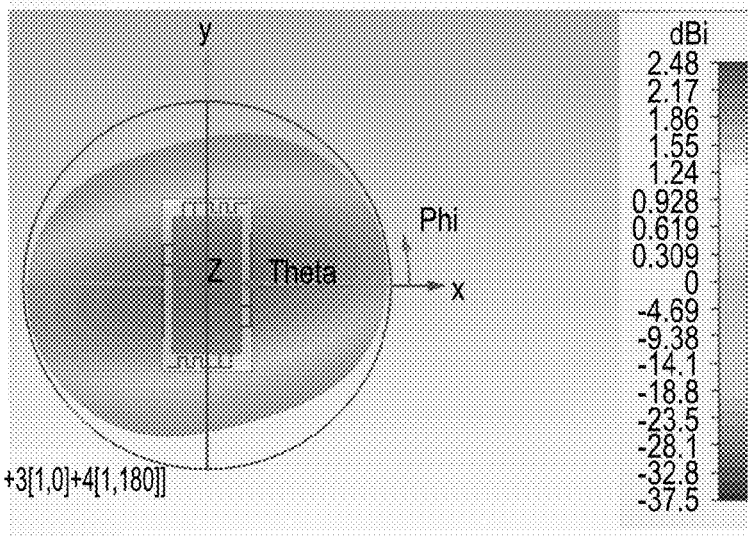
Figure 10D:
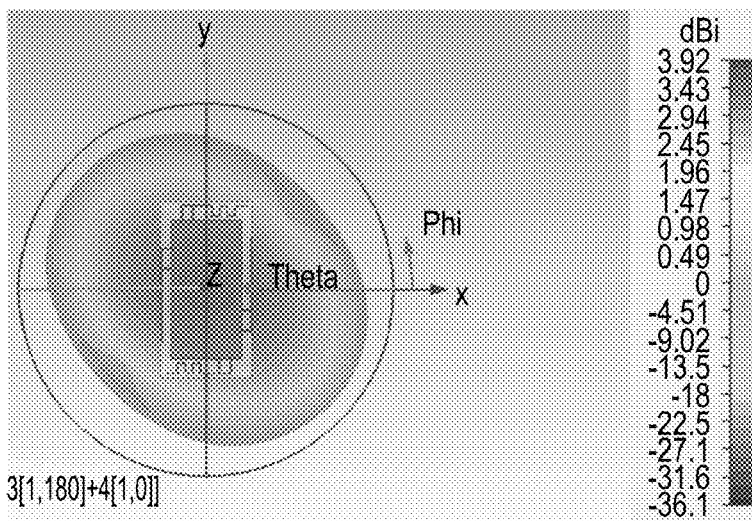
Figure 10E:
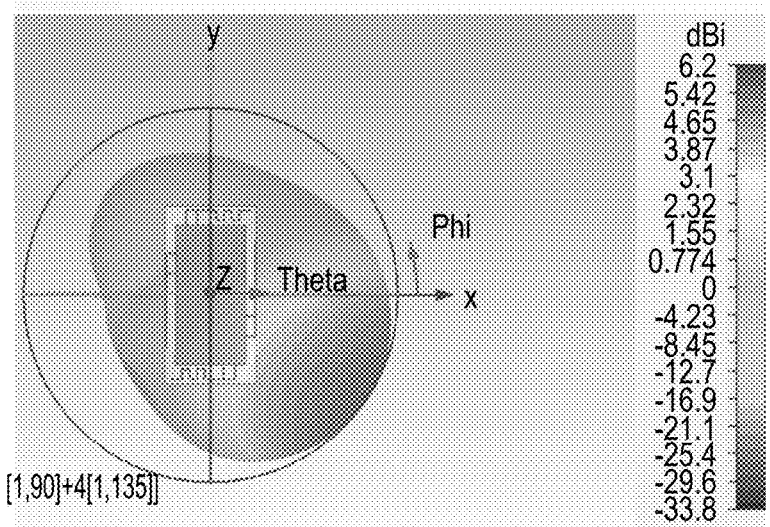
Figure 10F:
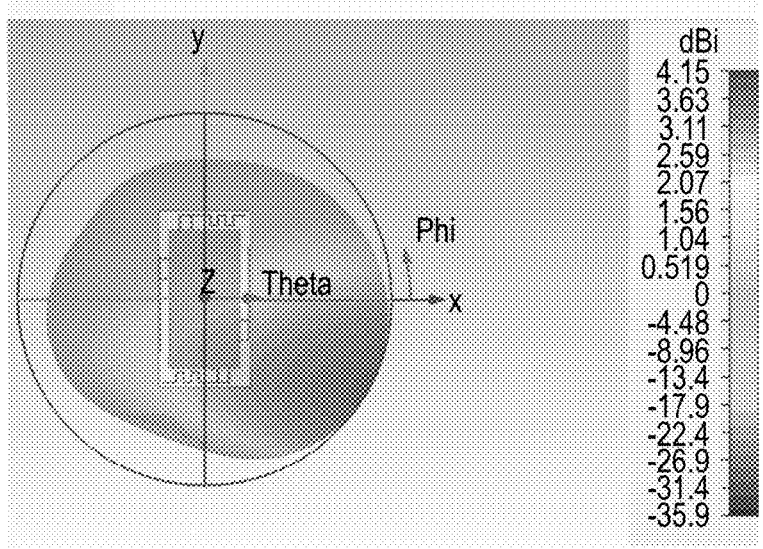
Figure 10G:
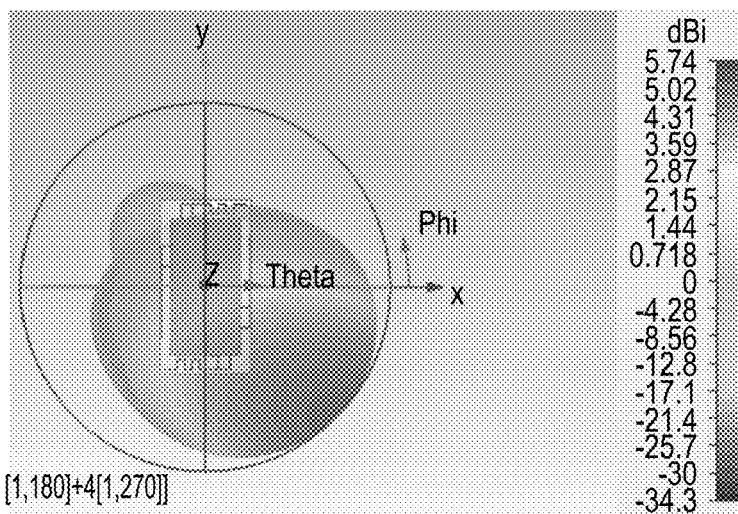
Figure 10H:
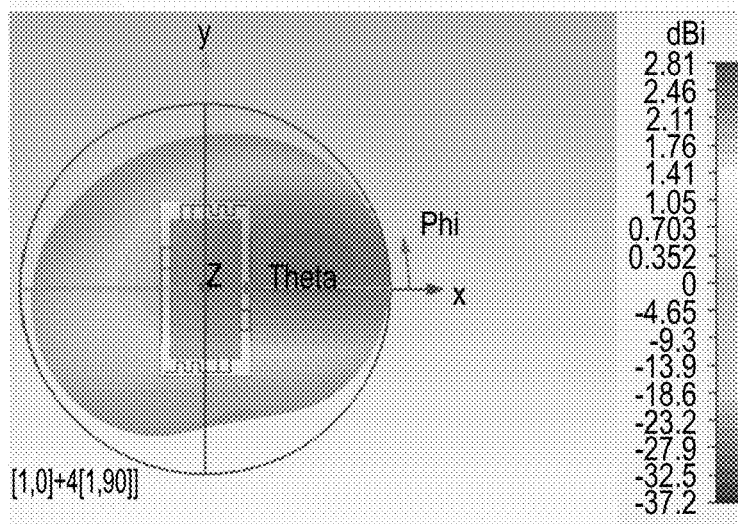
Figure 10I:
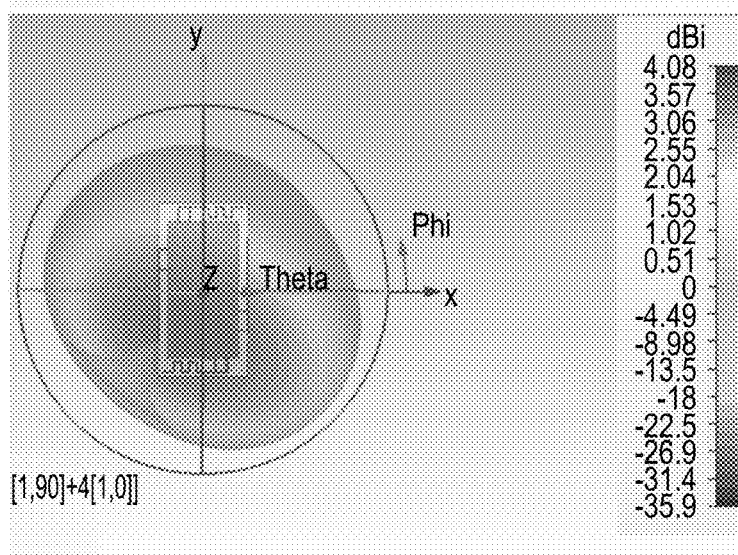
Figure 10J:
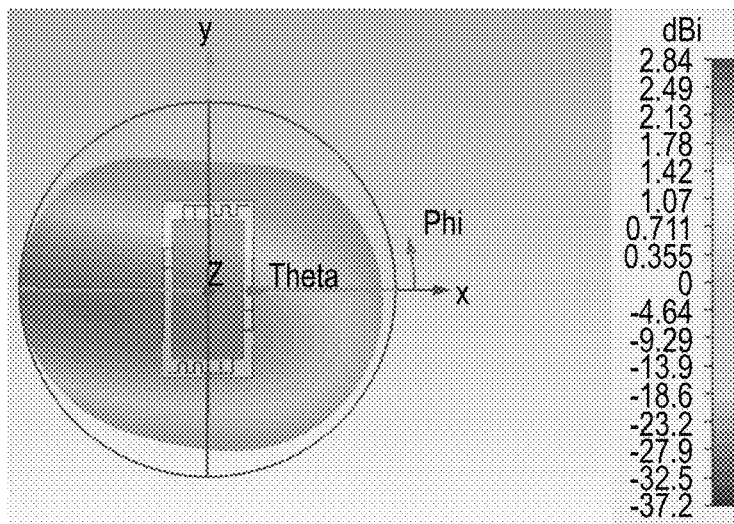
Figure 10K:
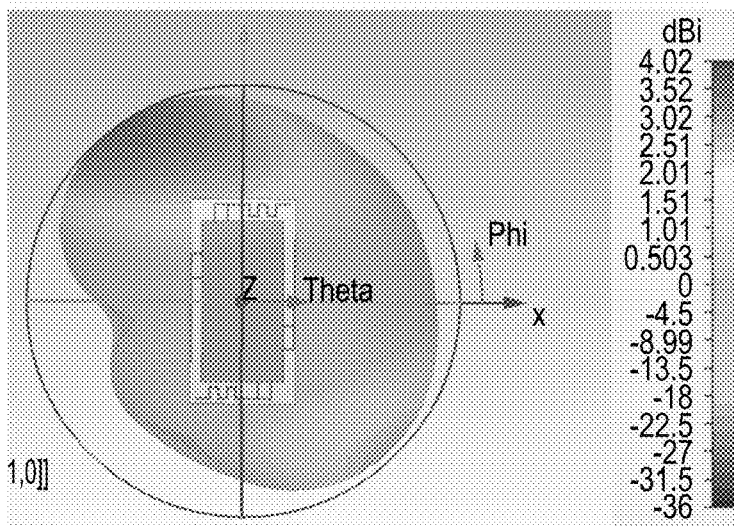
Figure 10L:
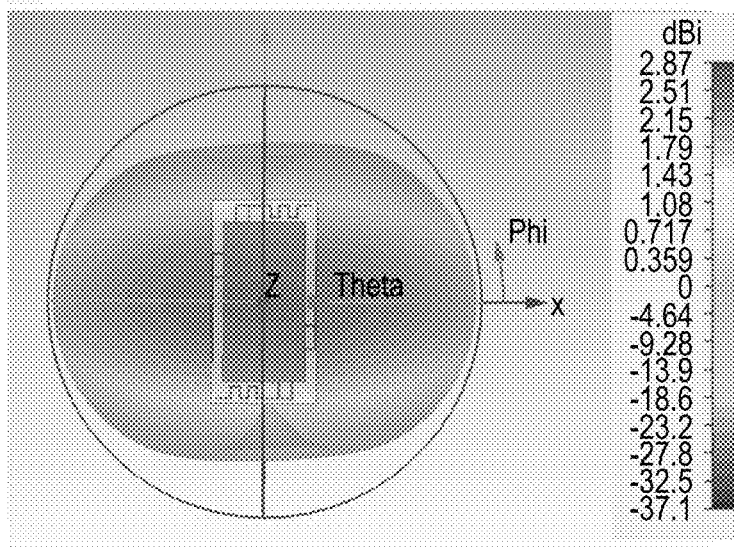

Reference is now made to FIG. 9A and FIG. 9B which are a schematic illustration of two exemplary connections of the beam steering antenna array of FIG. 8 to the transceiver (radio), according to some embodiments of the present invention.

Reference is now made to FIG. 10A to FIG. 10L which are a schematic illustration of exemplary simulated radiation patterns of the beam steering antenna array of FIG. 8, according to some embodiments of the present invention.

Optionally, RFID reader 101 is implemented in a case of mobile device 105. For example, RFID reader 101 may be attached to the inner side of a case so it is adjacent to mobile device 105, may be concealed on a front cover of a case, may be included in a detachable part of a case, or may be included in a lower part of a case close to a connector of mobile device 105.

Figure 11:
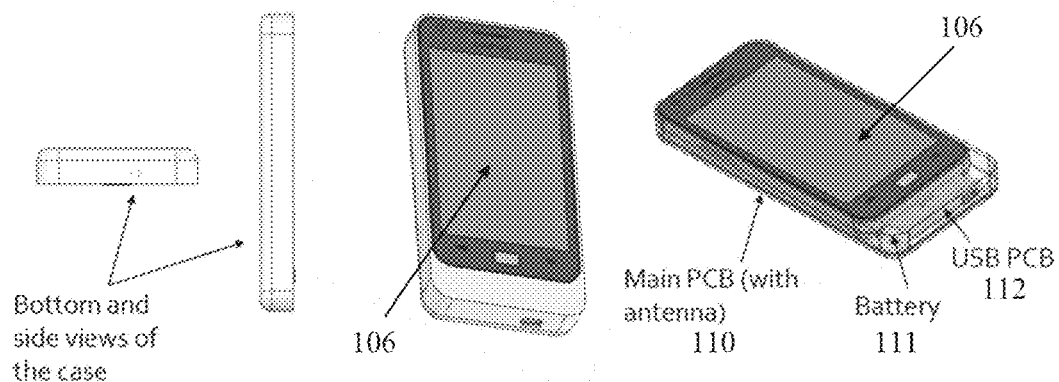
FIG. 11 is a schematic illustration of an exemplary structure of a RFID reader accessory in the form of a smartphone case, according to some embodiments of the present invention.

Reference is now made to FIG. 11 which is a schematic illustration of an exemplary structure of a RFID reader accessory in the form of a smartphone case, according to some embodiments of the present invention. A smartphone is encased by the system at all but one side. The illustration shows bottom, side, and front views, and also a transparent view of the case to make visible a main PCB 110, a battery 111, and a USB PCB 112. USB PCB 112 has a prong to insert into the smartphone USB socket. In the embodiment illustrated above (front, side, and end views), the outer case is the platform supporting mobile device 106, the main and USB PCBs (which may be one united board), the battery, etc., but in alternate embodiments the platform may be embodied as a component to replace the back cover of the mobile device, or to be under the original back cover of the mobile device.

Figure 12A:
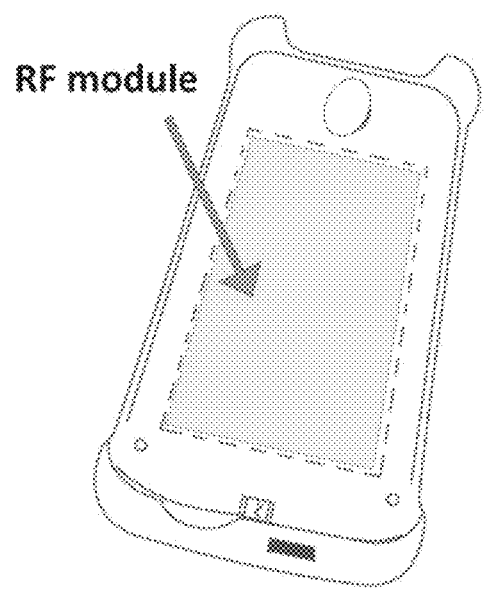
FIGS. 12A, 12B, 12C and 12D are schematic illustrations of different types of mobile device accessories in the form of a smartphone cases, according to some embodiments of the present invention.
Figure 12B:
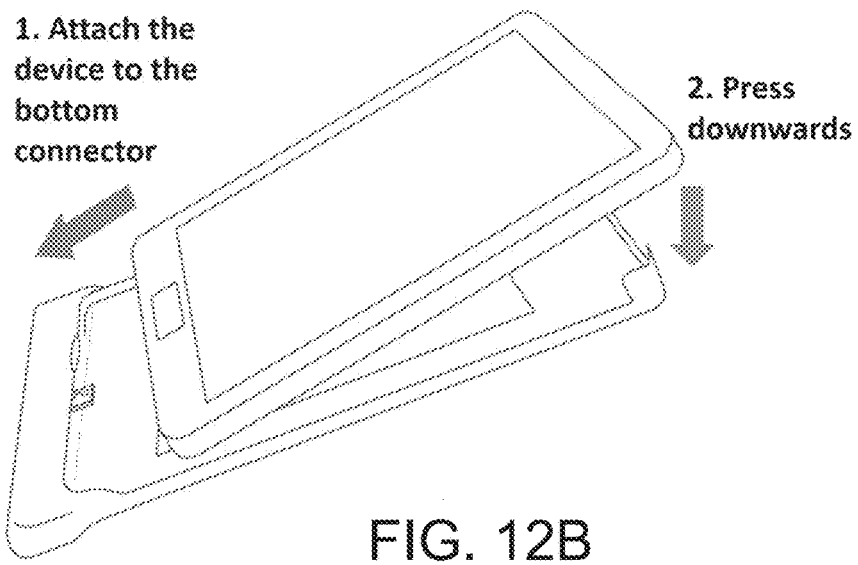
Figure 12C:
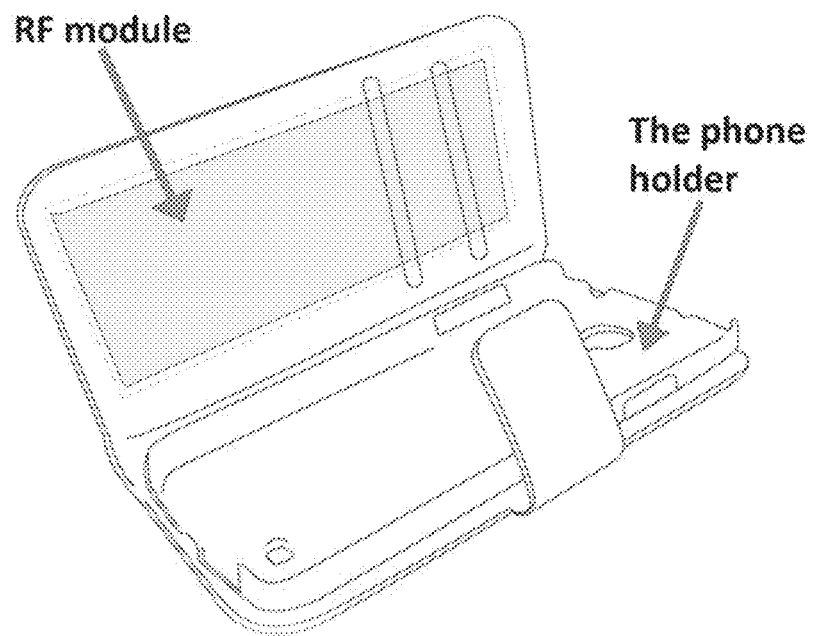
Figure 12D:
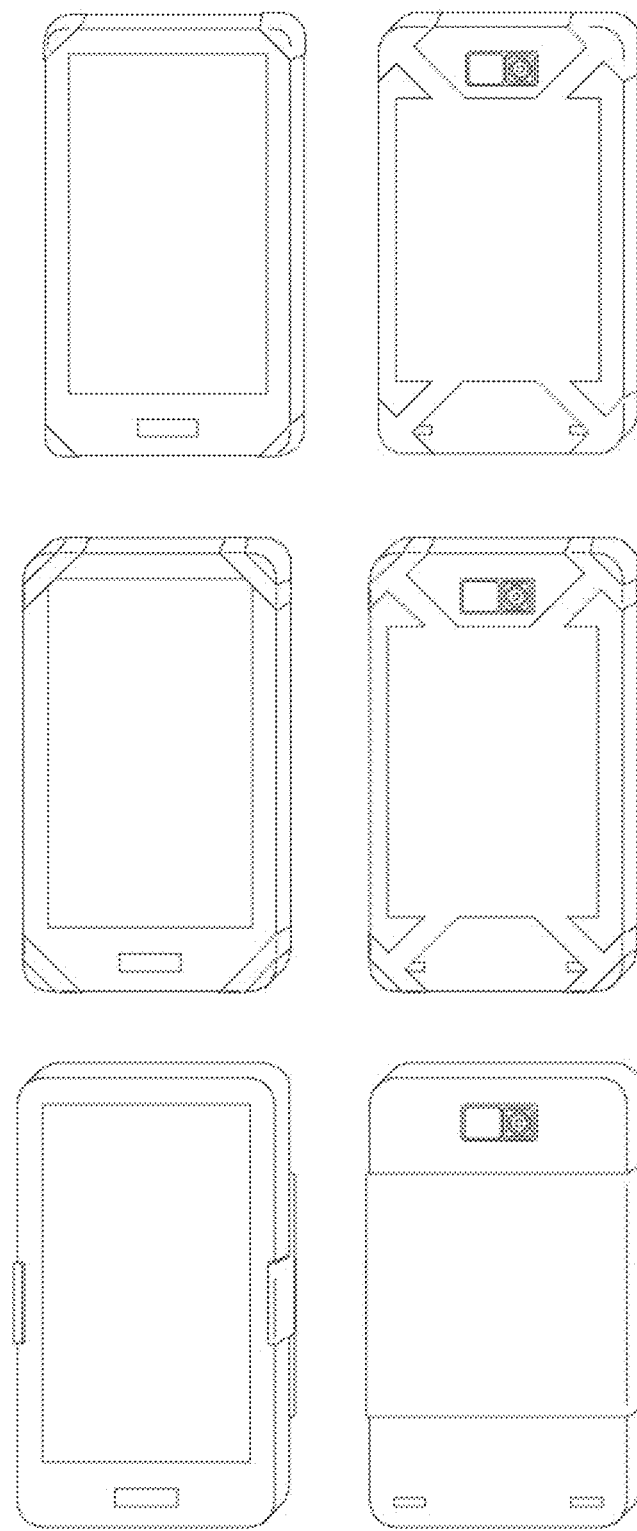

Reference is now made to FIGS. 12A, 12B, 12C and 12D which are schematic illustrations of different types of mobile device accessories in the form of smartphone cases, according to some embodiments of the present invention. FIG. 12A shows a smartphone cases including an RF module on the back. FIG. 12B shows a smartphone being mounted into the RFID reader back-case. FIG. 12C shows a closing (flip) cover with an RF module which is hidden inside the upper, closing side. The RF module communicates wirelessly (e.g. via Bluetooth) with the Smartphone which is placed in the corresponding place on lower side. FIG. 12D shows other possible RF-enabled back-cases.

Figure 19:
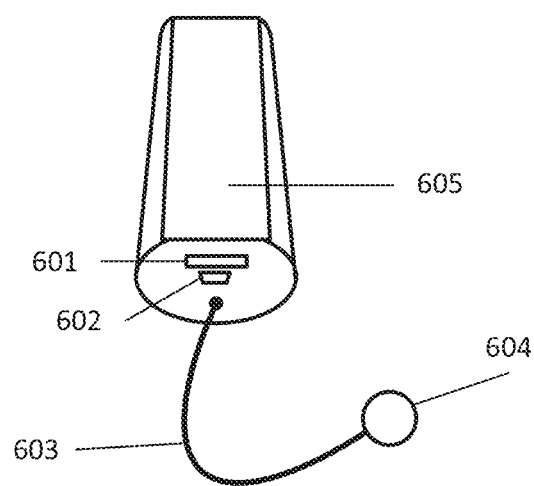
FIG. 19 is a schematic illustration of an RFID reader accessory in the form of an oblong body dongle unit, according to some embodiments of the present invention.

Reference is now made to FIG. 19 which is a schematic illustration of an RFID reader accessory in the form of an oblong body dongle unit, according to some embodiments of the present invention. In these embodiments, the dongle unit communicates with the mobile device using a wireless communication interface such as WiFi or Bluetooth™. The dongle unit's body may comprise a flat surface 605 which may be held against the back of the mobile device such as the back of a smart phone. In such embodiments, the dongle unit may comprise USB receptacles 601 and/or 602 for charging a rechargeable battery. In such embodiments, the dongle unit may comprise a cord 603 physically attached to the dongle unit's body. Optionally, the dongle unit's antenna may be inside cord 603. In some embodiments, the cord may be physically attached to a ring 604, which may be used to connect the dongle to another object such as a key chain ring.

Optionally, an application, which is running on mobile device 106 and includes computation module 103 and control module 104, controls the adjacent RFID reader 101 via wired/wireless media, and gives the RFID reader 101 commands when to transmit/receive radio signals to identify, track, or find any tagged objects, and how to do it. The power of transmitted signal is also controllable by the application and the mobile device. Optionally, when the inner power of RFID reader 101 is not sufficient for the required operation, RFID reader 101 may use power from mobile device 105.

Optionally, users may place RFID tags 100 on objects to be tracked, such as valuable property, or people, and register the objects using the application on mobile device 105. The application controls RFID reader 101 by specifying the strength, timing and kind of radio-signals to transmit to the tag, and by determining from the response signals the tag identity and location.

Figure 13A:
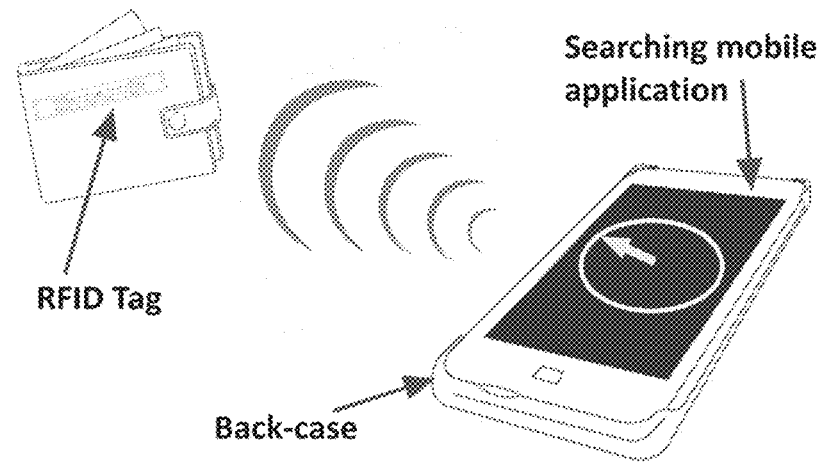
FIG. 13A is a schematic illustration of an exemplary structure of an RFID reader system in the form of a smartphone case and a screen showing an arrow pointing to the RFID tag, according to some embodiments of the present invention.
Figure 13B:
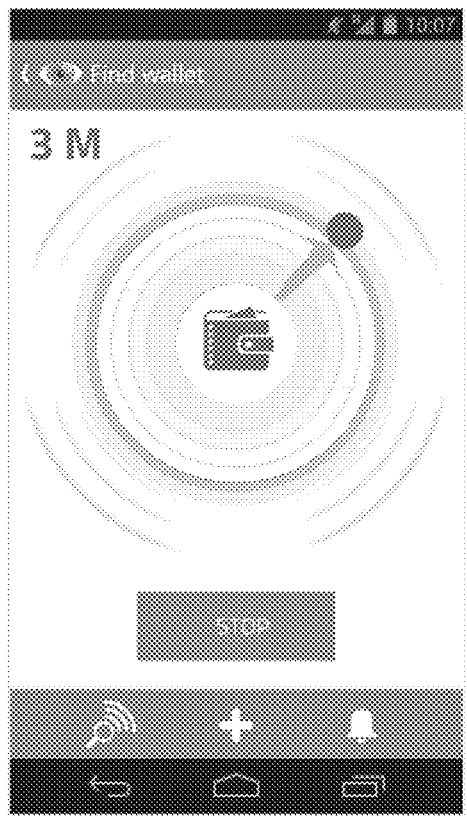
FIG. 13B is an exemplary screenshot of a user interface showing an arrow pointing to the RFID tag attached to a wallet, according to some embodiments of the present invention.

Optionally, the application may direct the user to a tracked item by providing a user interface on the screen of mobile device 105, with an arrow pointing to the item which indicates a direction with an estimate of the distance from the current device position to the searched-for item. Reference is now made to FIG. 13A which is a schematic illustration of an exemplary structure of an RFID reader system in the form of a smartphone case and a screen showing an arrow pointing to the RFID tag, according to some embodiments of the present invention. Reference is also made to FIG. 13B which is an exemplary screenshot of a user interface showing an arrow pointing to the RFID tag attached to a wallet, according to some embodiments of the present invention. Optionally, the user interface includes a 3D image representation of the space, with an indication of the tag's location implemented in the 3D image. Optionally, the user interface includes a real-time image of the surrounding area of the mobile device, and an indication of the location of the tag overlaid on the image as augmented reality. The image real-time may be received from an imaging sensor of the mobile device, such as a camera.

Optionally, the application may continuously track specified tagged items. Optionally, the application sounds an audible alert when any of the specified items may no longer be tracked, thereby warning that the item has disappeared from the tracking range.

Optionally, the application may indicate the approach of one tagged object to another tagged object. The application may indicate to the user, for example by sound or visual indication that a specific item with RFID tag starts to appear in the tracking range. This may be used for any type of territorial intervention prevention, borders crossing, etc.

Optionally, the application may record the places or locations where a user had been during a predefined period of time by means of algorithm based on Global Positioning System (GPS), GPRS, Wi-Fi, Bluetooth, or other wireless or wired methods, allowing the user to use this information afterwards to go back to the locations in this list, and to provide suggestions for searching for the missing items there.

Optionally, the application may identify items with RFID labels affixed thereon, and provide the item's related information. The application may function as a platform that identifies items, stores/retrieves item-related information such as item's manufacturer, owner, date of purchase, history, expiry date, item's picture, its story, and the like. Optionally, the application may track items' retail history and all their transactions, including their manufacturing and packaging, their transportation, and their purchases. More than one RFID reader may be used, stationing each at strategic points, such as at entrances/exits to/from a shop, entrances/exit to/from a warehouse, and on roofs of trucks. When an RFID reader is stationed as described above, it may pass the read data from the tags it scans to mobile device 105 by wired or wireless means, so the application may be used without a special case. Optionally, the application may determine whether the tagged item is moving in or not by using Relative Signal Strength Indicator (RSSI) information. Optionally, the user interface of the application may also show approximate real-time item location on the device screen or show its last recorded associated location to help find the missing item. Optionally, the application may also prevent items from being stolen by sounding an alarm when item disappears from tracking range. Optionally, the application may check each item's expiry date, so the item may be suggested to left the shelf or to be sold soon.

Figure 20:
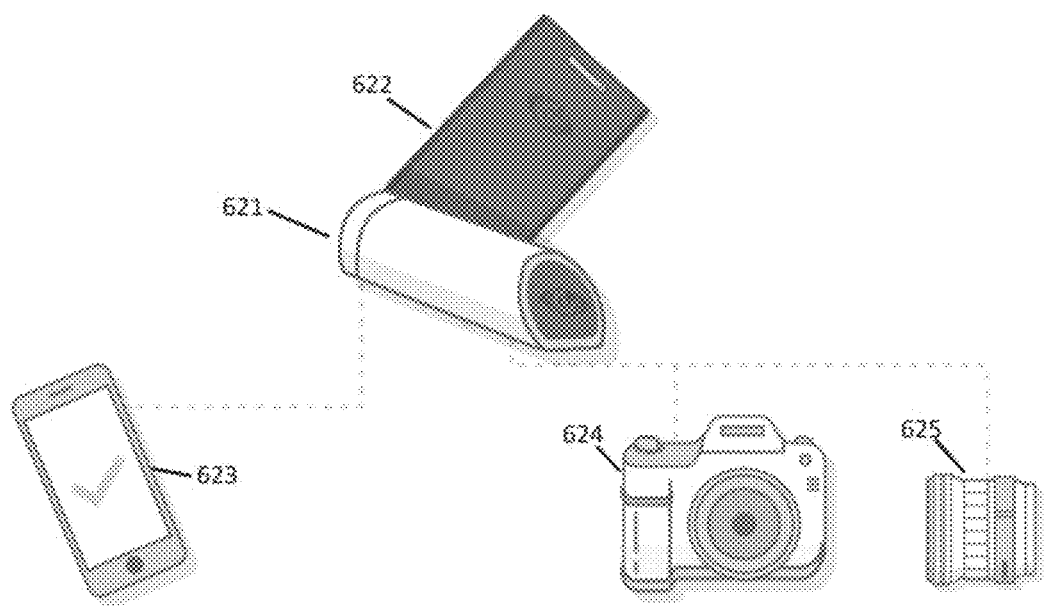
FIG. 20 is a schematic illustration of an exemplary system having an RFID reader accessory, a mobile device and RFID tags attached to items, according to some embodiments of the present invention.

Reference is now made to FIG. 20, showing an exemplary system using an RFID reader, a mobile device and tags attached to items, according to some embodiments of the present invention. A mobile device 623 may communicate with an RFID reader shaped as a dongle unit 621 or a mobile device case 622. The RFID reader may communicate with multiple RFID tags attached to items such as a camera 624 or a camera lens 625.

Reference is now made to FIG. 21B, showing a possible user interface showing the status after a successful pairing between an RFID tag and an RFID reader, according to some embodiments of the present invention. After the RFID pairs with an RFID tag, an indication may be displayed on an application running on a mobile device communicating with the RFID reader.

Reference is now made to FIGS. 21A and 21C, showing two possible user interfaces showing status after searching for a plurality of RFID tags, according to some embodiments of the present invention. In both possible user interfaces, the missing items are indicated by an X mark.

Figure 22:
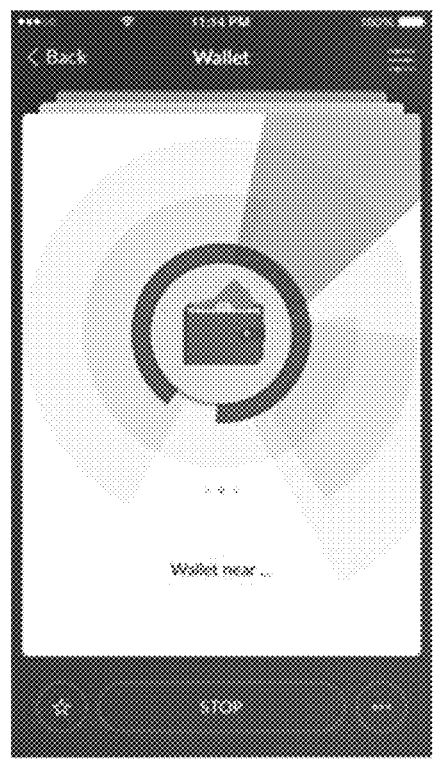
FIG. 22 is an exemplary screenshot of a possible user interface showing indication of an RFID tag's distance from an RFID reader, according to some embodiments of the present invention.

Reference is now made to FIG. 22, showing a possible user interface showing indication of an RFID tag's distance from an RFID reader, according to some embodiments of the present invention. When a user searches for an item located by the RFID reader, an application running on a mobile device communicating with the RFID reader can display darker and brighter images in the direction where the RFID reader detects the RFID tag attached to the item, and display lighter and dimmer images in other directions.

Other uses of the application may be for military applications, tracking equipment such as weapon, equipment, supplies, and concealed locations; for health care for example to track patients (including newborns), health facility guests, equipment, and medicine; remotely access databases of patient history records based on patient's tag data; to prevents parents from forgetting babies in the car by putting on a baby some wearable item with a passive or active RFID, Wi-Fi or Bluetooth tag, and turning on the tracking (alerting) mode of the application. When the baby is left in the car, the mobile device of the parent will sound an alert signal. The application may also be used for social dating or conferences, by providing direct indoor navigation to location of interested parties, with possible retrieving of information about them; for games for example to assist "treasure hunt" competitions, when "treasure" is tagged with RFID sticker; "hiding" games, "warmer-colder" games; to help avoid falsification and fraud by identifying the item's declared genesis or belonging to a specific brand or genuine origin and uniqueness of item; in museums and exhibitions by retrieving the information about any piece of art or other tagged item when approaching to it; in archives, for example, within libraries or schools, to maintain accurate listings of documents, books, and the like; and assists in locating desired items; and/or for 3D navigation with a mobile device and attached or stationary RFID reader, by using stationary tags in specific locations or on the predefined items.

Optionally, the application may also be used for shopping purposes, for example when a shopper or a store is equipped with the inventive hardware. The shopper that has the application on his/her mobile device enters the store. Software associated with the store (the software being a specific additional app for incorporated into the base application) advises the shopper and/or promotes specific products, and the embodiment directs the shopper to the location within the store where the product resides.

Optionally, the application may also be used for assisting visually impaired people. For example, the application may be voice-activated such that a user may state audibly the object searched for or a place desired, and the application directs the user and tells the approximate distance to it via voice commands, for example, to move X steps/meters left, right, forward, backward, or in diagonal directions (left-forward, and the like.) towards the object or place, which was tagged with RFID sticker, tag or label. Optionally, the application provides audio warnings when users approach an object marked with an RFID tag. Thus, the risk of accidental contact with the object is reduced.

Optionally, the location of the tag is determined by using different directions of the main lobe of a multi-directional antenna. The multi-directional antenna may perform direction scanning for example by switching between variable linear and circular polarizations.

Optionally, RFID reader 101 includes two or more the antennas, and the direction and distance to the tag is determined by performing triangulation to the distance data received from each of the antennas and using the known difference between the locations of the antennas.

Optionally, the location of a tag is calculated using triangulation algorithm based on data from built-in sensors of mobile device 105 combined with a tag's RSSI received by RFID reader 101.

RFID readers perform coherent detection and may calculate both the power and the phase of the tag signal. Tag phase may be best explained in phase vector space, I-Q, and thus in a baseband terminology, creating analytical signal using Hilbert transform. The complex demodulated voltage at the reader-receiver at any given moment of time may be written as sum of three components:

$$V_{receiver} = V_{leakage} + V_{clutter} + V_{tag}$$

where $V_{leakage}$ denotes the voltage due to the reader transmit-receive leakage, $V_{clutter}$ denotes the voltage due to the scatter from the environment clutter, and $V_{tag}$ denotes the voltage due to backscatter from tag.

All components are assumed stationary during short time of representation. Using baseband terminology, at the reader, the in-phase (I) and quadrature (Q) components of the received and demodulated tag signal are composed of DC and AC parts: $I = I_{dc} + I_{ac}$, $Q = Q_{dc} + Q_{ac}$ The DC parts are due to the reader transmit-receive leakage, static environment clutter, and backscatter from the tag. After the DC part is filtered out, the tag constellation is centered at zero and one may measure both RSSI and phase of are represented as:

$$RSSI = \frac{(I_{ac}^2 + Q_{ac}^2)}{(Z)}, \phi = \arctan\left(\frac{I_{ac}}{Q_{ac}}\right)$$

where Z denotes input impedance of the receiver.

When the tag is detected, the measurement point is established and the following data is collected: (1) An RSSI value received from that tag, which may be translated into distance to the item using dedicated formulas (some averaging of RSSI collected in very close points (with distance between those points less than predefined delta) may be applied in order to determine distance more precisely), and (2) Current mobile device location relative to its previous location. The application uses the above parameters, and continues to collect the data received for a number of measurement points, to calculate a direction vector to the tag using the following algorithm. A person trying to locate an item tagged with RFID tag will move with the equipped mobile device while searching for that item. When the person is not moving, the application encourages him/her to start moving in some random direction till the tag is detected by the RFID reader.

The first location of a mobile device, where the tag has been seen, has coordinates $L_1 = (x_1, y_1, z_1)$, the second location has coordinates $L_2 = L_1 + d1 = (x_2, y_2, z_2)$ and third location has coordinates $L_3 = L_2 + d2 = (x_3, y_3, z_3)$, and so on. In every location (measurement point) $L_i$ the mobile device knows that the tag is located in distance $r_i$ from it ($r_1$, $r_2$, $r_3$, . . . at locations $L_1$, $L_2$, $L_3$, . . . respectively), where r denotes calculated using RSSI of the tag as described above. Without knowing the exact location of measured object, the set of all possible location points at distance r from the device creates a sphere with radius r and center at L (so-called measurement sphere).

In ideal case, where the measurements shows exact information about mobile device movement and distance to the measured object, spheres from different measuring points should always touch and the object being searched for should always be located on their tangency point. Due to the sensors noise, and probably inaccurate RSSI values, an error may exist in the measurements, so above spheres may not intersect, or intersect not only in one tangency point. Therefore, regular triangulation methods are insufficient, and the following is used: (1) reduce the error by averaging or filtering; and (2) search not for the tangency points between two spheres, but for points which are located as near as possible to each other (also called a set of nearest points) on both spheres.

Figure 14A:
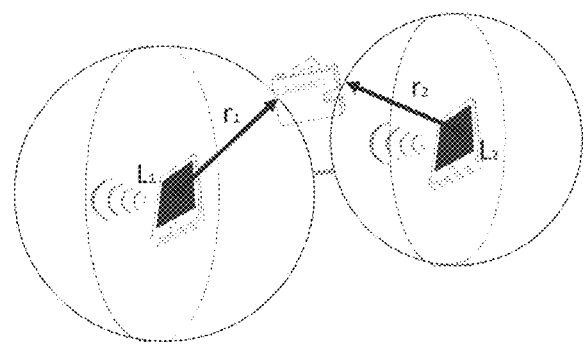
FIGS. 14A, 14B, 14C and 14D are schematic illustrations of several possible positions of the measurement spheres in space, according to some embodiments of the present invention, according to some embodiments of the present invention.
Figure 14B:
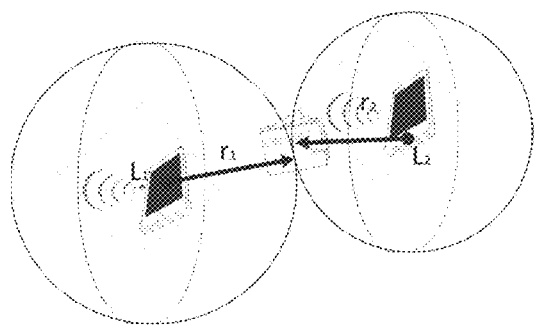
Figure 14C:
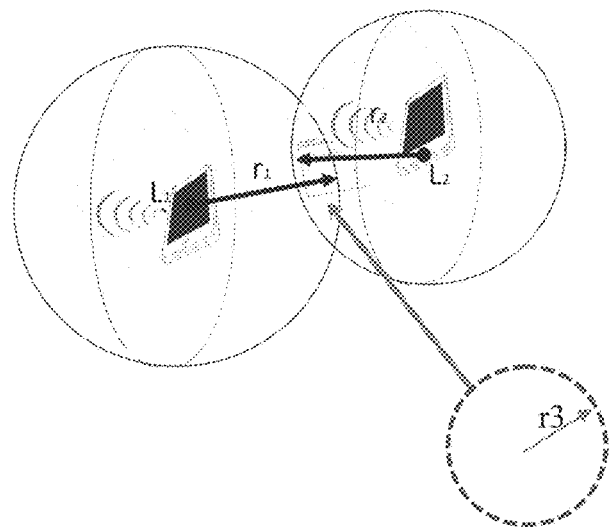
Figure 14D:
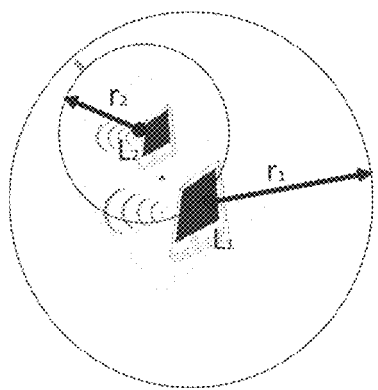

Reference is now made to FIGS. 14A, 14B, 14C and 14D which are schematic illustrations of several possible positions of the measurement spheres in space, according to some embodiments of the present invention. In FIG. 14A the spheres do not intersect and the item is assumed to be in the middle of the shortest distance between two spheres. When the distance is bigger than a predefined delta, additional measurement points should be considered. In FIG. 14B the spheres have one point of tangency, the ideal case, where the object is right in that point. In FIG. 14C the spheres intersect, forming a circle where intersection of their surfaces occurs. The tag is located on that circle's edge line. When the circle's radius is smaller than a predefined delta, the tag is assumed to be in the center of the circle. When the radius r3 is bigger than the predefined delta, additional measurement points should be considered. In FIG. 14D the spheres do not intersect (as in FIG. 1), but rather one is inside the other. The shortest distance between their surfaces is searched and the tag is assumed to be located in the middle of that distance. When the spheres' centers are overlapping, or the distance is too big (bigger than a predefined delta) then additional measurement points should be considered.

Figure 15:
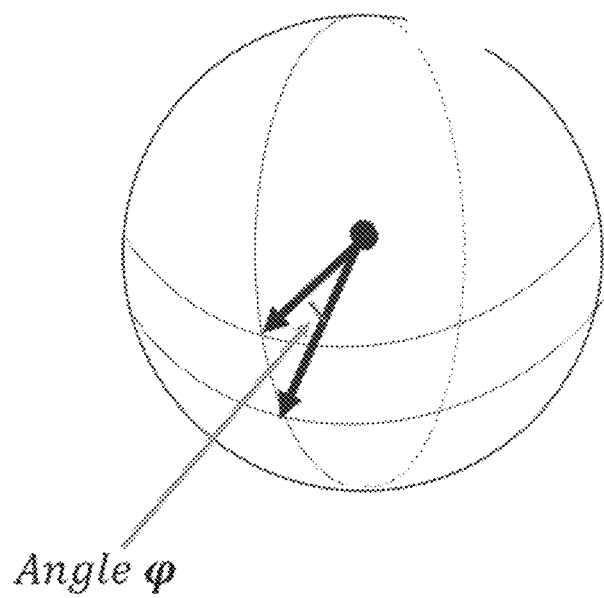
FIG. 15 is schematic illustrations of a measurement sphere and a predefined angle.

The possible positions above may be generalized by a common approach. To find above nearest points, every measurement sphere is sampled by number of points on its surface located not far than specified delta D one from another, or not far then the predefined angle φ, as shown in FIG. 15. The sampling is done by dividing each sphere into n horizontal parallels, each of them ($i \in [1 \ldots n-1]$) in its turn is divided into $$\left\lceil \frac{2n}{\sin i \cdot \frac{\pi}{n}} \right\rceil$$

intervals. The most right point of each interval is considered to be a sampling point. n is chosen so that the condition of being not far then the predefined angle φ between points is reached.

So the coordinates of sampling point are:

$$x_{i,j} = L_x + r \cdot \cos\theta_{i,j} \cdot \sin\varphi_i$$
$$y_{i,j} = L_y + r \cdot \cos\theta_{i,j} \cdot \sin\varphi_i$$
$$z_{i,j} = L_z + r \cdot \cos\varphi_i$$

-continued where:

$i \in [1 \ldots n-2]$ $j \in 0 \ldots \left\lceil \dfrac{2n}{\sin i \cdot \dfrac{\pi}{n}} \right\rceil$ $\varphi_i = i \cdot \dfrac{\pi}{n}$ $\theta_{i,j} = j \cdot \dfrac{\pi}{n} \cdot \sin i \dfrac{\pi}{n}$ And the number of sample points for one sphere:

$$2 + \sum_{i=1}^{n-2} \left\lceil \dfrac{2n}{\sin i \cdot \dfrac{\pi}{n}} \right\rceil$$

The distance function between two points in space a, b which is used, is:

$$d(a,b) = \sqrt{(x_a - x_b)^2 + (y_a - y_b)^2 (z_a - z_b)^2}$$

Given two sets of sampling points of two spheres surfaces ($S_1 = (L_1, r_1, s_1)$ and $S_2 = (L_2, r_2, s_2)$) a set of nearest (or common) points ($N(S_1, S_2)$) is defined between them as set of sampling points from contains of pair of two points, each one from its sphere, which has smallest distance $$d_{min} = \min_{p_i \in L_1, p_j \in L_2} d(p_i, p_j)$$

one from another. Also the set will contain all sampling point pairs from both spheres which are located not further than:

$$d_{min} + \min(s_1, s_2)$$

So, the set of nearest points contains all "common" points of two spheres if they intersect or the set of "nearest" points of two spheres otherwise.

The diameter of the set of nearest points is defined as:

$$d(N) = \max_{p_i \in N, p_j \in N} d(p_i, p_j)$$

The center of the set of nearest points if defined as:

$$c(N) = \dfrac{\sum_{p \in N} p}{|N|}$$

When the mobile device is moving, it measures the distance to the monitored tag from time to time. Every time the measurement is performed, the distance from the previous measurement location is calculated, too. As a result, there is a sequence of measurement locations ($L_1, L_2, \ldots$) and their corresponding distances to the monitored object ($r_1, r_2, \ldots$). At every new location ($L_i, r_i$), the set of nearest points ($N_{i,i-1}$) between this location and the previous one ($L_{i-1}, r_{i-1}$) is calculated. When the diameter of the set ($d(N_{i,i-1}.)$) is smaller them a predefined constant, the center of the set is considered to be the location of the tag.

Otherwise, a previous calculated set ($N_{i-1,i-2}$) is used and a new set of nearest points between two above sets is calculated: $N_{i,i-1,i-2} = N(N_{i,i-1}, N_{i-1,i-2})$. Now, when the diameter of new set ($d(N_{i,i-1,i-2})$) is smaller them some predefined constant, the center of the set is considered to be the location of the measured object. Otherwise the measured object is considered not be found and the algorithm continues to wait for additional measurements.

One possible use case for the above algorithm is to show a distance and direction arrow (vector) on the screen of a mobile device, directing user to the location of the measured object. To do so, the calculated measured object location should be projected on the plane of the mobile device's screen. Geomagnetic (e.g. gyroscope) and accelerometer sensors may be used to produce rotation matrix (R). Then a transpose (or invert) is made on the received matrix because the coordinates vector has to be rotated to the mobile device's coordinates space. Then a location of the tag in the mobile device coordinates space is received by simple multiplication: L'=R·L, where L denotes the location of searched object, and L' is its location in the mobile device's coordinates.

Figure 16:
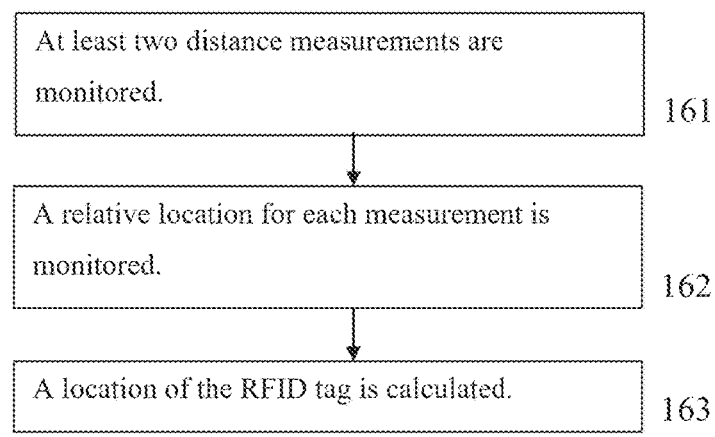
FIG. 16 is a flowchart schematically representing a method for calculating the location of an RFID tag, according to some embodiments of the present invention

Reference is now made to FIG. 16, which is a flowchart schematically representing a method for calculating the location of an RFID tag, according to some embodiments of the present invention.

First, as shown at 161, at least two distance measurements of an RFID tag from an RFID reader device are monitored.

Then, as shown at 162, a relative location of the RFID reader device for each of the distance measurements is monitored.

Finally, as shown at 163, a location of the RFID tag relative to the current location of the RFID reader device is calculated based on the distance measurements and the relative locations.

Figure 17:
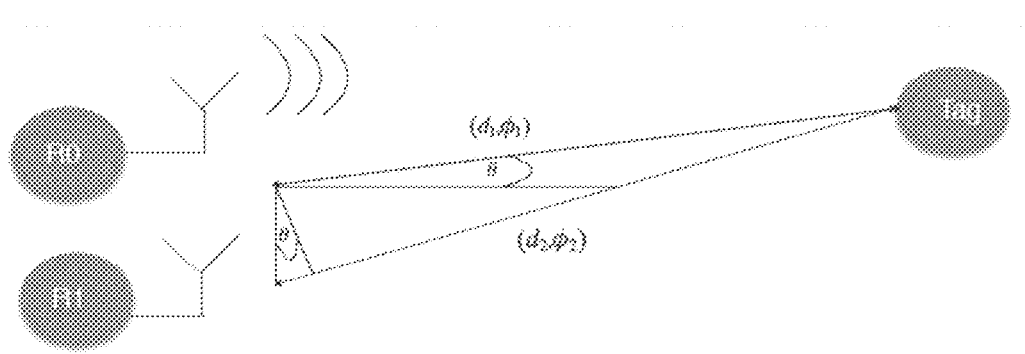
FIG. 17 is a schematic illustration of representing a moving reader configuration, according to some embodiments of the present invention.

Optionally, the location of the tag is calculated using Spatial Domain Phase Difference of Arrival (SD-PDOA). The method may be represented as direction-of-arrival estimation using phased pseudo array antenna. Many signal processing techniques have been developed in this field to improve angle estimation accuracy. Reference is now made to FIG. 17, which is a schematic illustration of representing a moving reader configuration, according to some embodiments of the present invention.

By measuring the phase difference $\phi_2 - \phi_1$ of the received tag signal at two different receiving poisons of the same receiver (at the fixed frequency channel) and attributing it to the path difference, two dimensional tag bearing may be approximately calculated as:

$$\theta = \arcsin\left(-\dfrac{c}{4\pi f} \dfrac{(\phi_2 - \phi_1)}{A}\right)$$

where A is the distance between the two positions of the receiver. Transmitted antenna may be located anywhere. Phase measurements on antenna at position 1 and 2 may be done sequentially, providing continuous measure of the phase difference.

The above equation assumes that the tag is far so that simple trigonometry may be used. In general, a set of hyperbolic equations may be used for localization, like it is done in GPS. Thus the phase tracking may be achieved using above method, but the phases are calculated according to antenna position in space.

Optionally, the location of the tag is calculated using a combination of the above methods and/or a method that includes some or all of the above data. For example, when the direction and distance to the tag is detected by the multi-directional antenna and/or by triangulation of data from two antennas, no other method is used. However, when the direction and/or distance is not accurate, the user may be directed to move to a different location in order to gather more data.

Optionally, the location of the mobile device is calculated using a motion path detection algorithm based on geomagnetic field sensor (e.g. Magnetometer) and acceleration sensor (e.g. Accelerometer). While the Accelerometer is used for detecting the movement direction and its magnitude, the Magnetometer adjusts the movement data to the current device orientation, providing the ability to combine both sensors' data to receive the correct movement vector value. The algorithm also provides a way to optimally filter the sensors' data making it possible to receive movement information clearly. For example, sensors usually built-in inside the modern mobile devices may be used. When such device is carried by a moving person, every small movement is analyzed, and the motion path of the person is measured.

The algorithm's input is an infinite data series received from sensors.

Accelerometer data: Accelerometer$_i$, where i∈ℕ and every data sample (Accelerometer$_i$) contains three floating point values: x, y and z, which provides device acceleration towards corresponding axis (relatively to device orientation) in $$\frac{m}{s^2}.$$

Geomagnetic data: Geo$_i$, where i∈ℕ and every data sample (Geo$_i$) contains three floating point values: x, y and z, which contains a measurement of ambient magnetic field in corresponding axis (relatively to device orientation) in µT.

Usually these values represent: (1) azimuth—rotation around the Z axis; (2) pitch—rotation around the X axis; and (3) roll—rotation around the Y axis.

Due to the fact that Accelerometer sensor contains acceleration values relative to device orientation, they have to be converted to the original coordinates space. The conversion may be made using following methods:

Given input Accelerometer=(A$_x$, A$_y$, A$_z$) and Geo=(G$_x$, G$_y$, G$_z$) data vectors, let's compute rotation matrix R. Function norm, which normalizes the given vector is defined as following:

$$norm(V) = \frac{V}{\sqrt{V}} = \left(\frac{V_x}{\sqrt{V}}, \frac{V_y}{\sqrt{V}}, \frac{V_z}{\sqrt{V}}\right)$$

An auxiliary vector H is defined as:

$$H=(G_y A_z-G_z A_y, G_z A_x-G_x A_z, G_x A_y-G_y A_x)$$

And after normalizing both A and H vectors:

$$A=\text{norm}(A)$$

$$H=\text{norm}(H)$$

An additional vector M is defined as:

$$M=(A_y H_z-A_z H_y, A_z H_x-A_x H_z, A_x H_y-A_y H_x)$$

The rotation matrix is:

$$R = \begin{bmatrix} H \\ M \\ A \end{bmatrix} = \begin{bmatrix} H_x & H_y & H_z \\ M_x & M_y & M_z \\ A_x & A_y & A_z \end{bmatrix}$$

Now, with a rotation matrix, the Accelerometer data may be converted into earth coordinates space: A'=R·A. The resulting (converted) Accelerometer data (A') is used as input for the algorithm.

The algorithm is built from number of phases: calibrating, gravity and speed adjustment, and movement detection.

Calibrating is the first phase. The exact number of iterations (C) depends on specific device performance and should be calculated separately for every device type. For example, C=1000. The purpose of the phase is to know the Accelerometer vector value when the device is still and resting. In that stage Accelerometer data is collected and the average value is taken. The calculated vector is called GRAVITY (G) because it reflects the influence of the current gravity values on acceleration sensor data, and is stored for the future use.

$$G = \frac{\sum_{i=0}^{C} A'_i}{C}$$

Gravity and speed adjustment—every time a new Accelerometer vector is received its magnitude is calculated and if it does not differ too much (using predefined delta value–$\Delta_{value}$) from the magnitude of currently stored GRAVITY vector during predefined number of sensor's ticks ($\Delta_{count}$), the GRAVITY vector value is updated with this new one. During updating the current GRAVITY vector the devices considered to be at rest and current device speed value (S$_i$) is zeroed:

for every A'$_i$:

if $|A'_{i-1}-G|<\Delta_{value}$ for $j\in[0 \ldots \Delta_{count}]$:

$G=A'_i$ $S_i=0$

Movement detection—For every new value received from Accelerometer, the previously calculated GRAVITY value is subtracted from the newly received vector: D$_i$=A'$_i$–G. Then the new value (D) is passed through simple smoothing filter (the filter constant—$\alpha_A$ value was 0.5): A$_i$=$\alpha_A$·D$_i$+(1–$\alpha_A$)·A$_{i-1}$. The received value is treated as device acceleration and is integrated in order to predict device velocity (S$_i$). This is done by getting average acceleration value (using acceleration value from previous accelerator tick) and multiplying it by time passed between two last ticks (a).

$$\Delta S_i = \frac{(A_i + A_{i-1})}{2} \cdot \Box t$$

The calculated speed delta ($\Delta S_i$) is added to previously stored speed value and the result is also passed through simple smoothing filter to receive current device speed (the filter constant—$\alpha_i$ value was 0.5):

$S_i=\alpha_S\cdot(S_{i-1}+\Delta S_i)+(1-\alpha_S)\cdot S_{i-1}$

Resulting speed value is also integrated to receive the length of the path passed by the device ($P_i$):

$$\Delta P_i = \frac{(S_i + S_{i-1})}{2} \cdot \Box t$$

$$P_i = P_{i-1} + \Delta P_i$$

Now $P_i$ contains the device location relative to the point where it was calibrated.

By connecting consequent $P_i$ locations, an approximate motion path is received. In order to make it more accurate, a few more techniques may be applied to overcome sensors noise ("drift") and accumulated error values, while differences between adjacent $P_i$ values ($\Delta P_i$) are very reliable as they are presented here.

Figure 18:
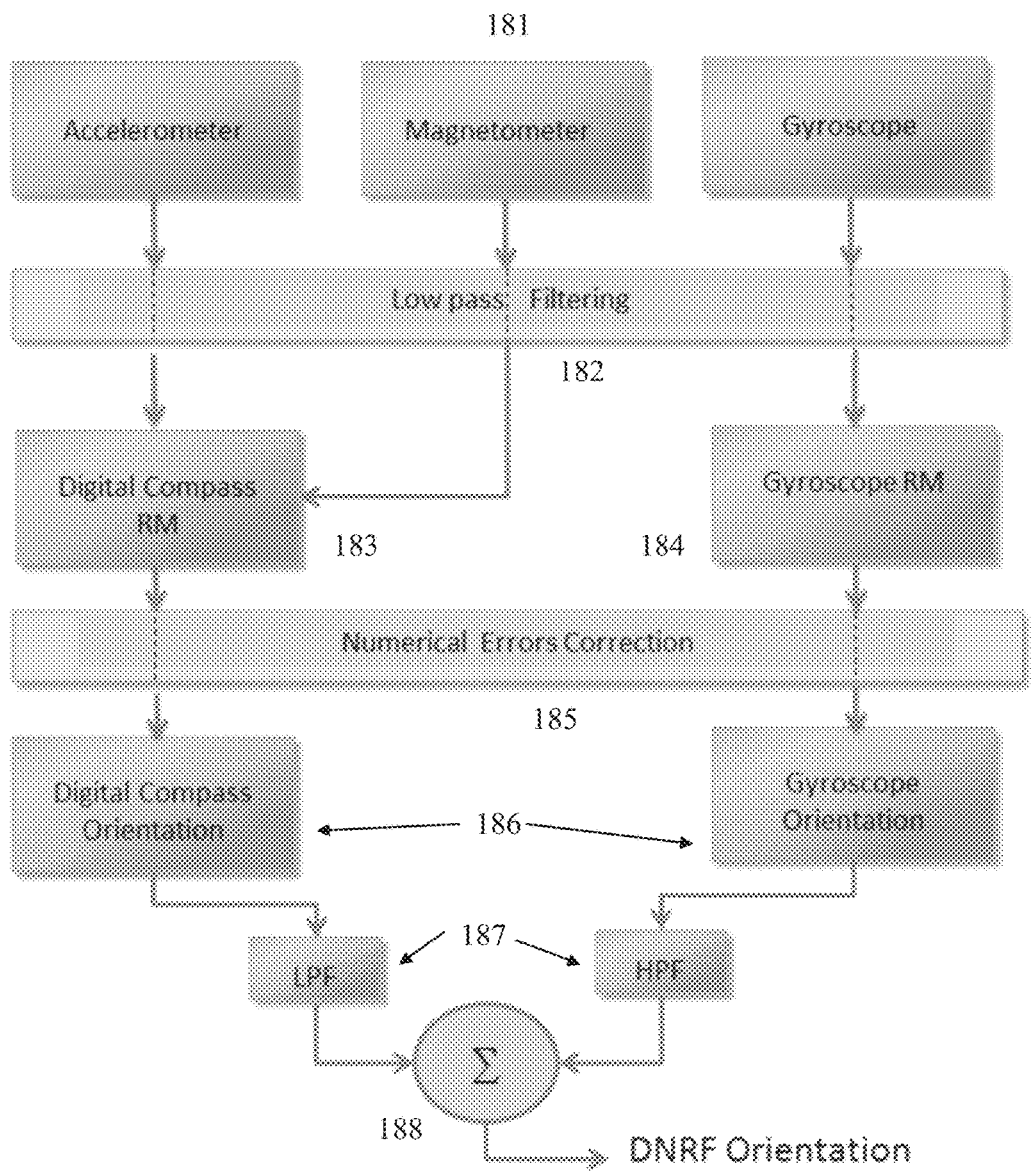
FIG. 18 is a flowchart schematically representing a method for calculating the location of a mobile device using acoustic, gyroscope, magnetometer and accelerometer sensors, according to some embodiments of the present invention.

Reference is now made to FIG. 18, which is a flowchart schematically representing a method for calculating the location of a mobile device using acoustic, gyroscope, magnetometer and accelerometer sensors, according to some embodiments of the present invention. The algorithm is similar to that used in MEMS based system and is bases on sensor fusion algorithm developed for indoor path tracking.

First, as shown at 181, measurements are received from Accelerometer, Magnetometer and Gyroscope which are independent sensors.

Then, as shown at 182, a low pass filter (LPF) is applied to remove unwanted noises.

Then, as shown at 183, a digital compass measurement is calculated from Magnetometer and Accelerometer measurements using rotation matrixes terminology (Positioning absolute North at Magnetic Pole).

Then, as shown at 184, Gyroscope measurement is calculated from raw Gyroscope measurement using a simple procedure of angle calculations.

Then, as shown at 185, numerical errors correction is performed to restrict errors that occur due to iterations and integration.

Then, as shown at 186, digital compass orientation and Gyroscope orientation are obtained.

Then, as shown at 187, LPF and high pass filter (HPF) are applied, using Wavelet transform.

Finally, as shown at 188, Construct Kalman filter is applied to predict motion, velocity and distance are calculated (time integration using fused accelerometer samples), rotation matrix is calculated for RFID phase correction and the SD-PDOA equation for θ is updated with respect to velocity and distance calculations, and antenna rotation is calculated with respect to rotation matrix.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant RFID systems will be developed and the scope of the term RFID is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A wireless reader accessory, comprising:
    at least one antenna, said at least one antenna comprises a multi-directional antenna array comprising at least two antenna elements substantially parallel to a ground conductive plate, each having horizontal and vertical polarizations, wherein said at least one antenna is electronically connected to an electric power source;
    a controller for adjusting phase and amplitude of an alternating current provided to each one of said at least two antennas by said electric power source to modify at least one of polarization and direction of a signal transmitted by said antenna array; and
    a body encasing said at least one antenna and said controller and shaped to be attached to an electronic mobile device;
    wherein at least one of said at least two antenna elements is an antenna element for radio frequency identification (RFID), comprising:
    a ground conductive element,
    a patch conductive plate substantially parallel to said ground conductive plate,
    a dielectric substrate positioned between said ground conductive plate and
said patch conductive plate, and
    at least two feeding lines, each electronically connected to said patch conductive plate and to an adjustable electric power source: and
    wherein an electric potential difference between said at least two feeding lines is
        adjustable by said electric power source to create alternating linear and circular polarizations of a signal transmitted by said antenna.

2. The wireless reader accessory of claim 1, wherein said at least two antenna elements includes at least one inverted F antenna element;
    wherein said at least two antenna elements includes four antennas positioned in a rectangular arrangement;
    wherein at least one of said four antennas is used for transmitting a signal and at least one of said four antennas is used for receiving a signal; and
    wherein said controller includes at least one phase and amplitude control device.

3. The wireless reader accessory of claim 1, wherein said body is shaped as a protective case for said electronic mobile device and is connected to said electronic mobile device via a charging connector of said electronic mobile device.

4. The wireless reader accessory of claim 1, further comprising a rechargeable battery; wherein said alternating current is provided by said rechargeable battery.

5. The wireless reader accessory of claim 1, wherein said alternating current is provided by a battery of an electronic mobile device.

6. The wireless reader accessory of claim 4, further comprising:
    a USB (Universal Serial Bus) receptacle for connecting to an electrical power source using a USB cable and charging said rechargeable battery; and
    a USB receptacle for connecting to an electronic mobile device having a rechargeable battery using a USB cable and charging said electronic mobile device's battery.

7. The wireless reader accessory of claim 1, wherein said controller is controlled by an application installed on said electronic mobile device;
    wherein said application includes a user interface that presents a location of an RFID tag that is located by said wireless reader accessory; and
    wherein said application performs periodic scans to find the location of an RFID tag that is located by said wireless reader accessory.

8. The wireless reader accessory of claim 7, wherein said application records at least one place or at least one location attended by a user during a predefined period of time, allowing the user to use said recorded at least one place or said at least one location in a later time, and wherein said application provides suggestions for searching for at least one missing item according to said recorded at least one place or said at least one location.

9. The wireless reader accessory of claim 8, wherein said recording is performed by an algorithm based on a member of a group consisting of: a Global Positioning System (GPS), GPRS, Wi-Fi, Bluetooth, wireless methods and wired methods.

10. The wireless reader accessory of claim 7, wherein said application tracks a plurality of wireless reader accessories, each positioned in another one of a plurality of strategic points, said plurality of strategic points includes at least one of an entrance to a shop, an exit from a shop, an entrance to a warehouse, an exit from a warehouse, and on at least one roof of a truck.

* * * * *